(12) United States Patent
Takaki et al.

(10) Patent No.: US 9,658,050 B2
(45) Date of Patent: May 23, 2017

(54) ROTATION ANGLE DETECTION DEVICE

(71) Applicant: JTEKT CORPORATION, Osaka-shi, Osaka (JP)

(72) Inventors: Takeshi Takaki, Shiki-gun (JP); Yuji Kariatsumari, Kitakatsuragi-gun (JP); Yoshinobu Shimizu, Sakai (JP)

(73) Assignee: JTEKT CORPORATION, Osaka-shi (JP)

( * ) Notice: Subject to any disclaimer, the term of this patent is extended or adjusted under 35 U.S.C. 154(b) by 639 days.

(21) Appl. No.: 14/104,500

(22) Filed: Dec. 12, 2013

(65) Prior Publication Data

US 2014/0163922 A1  Jun. 12, 2014

(30) Foreign Application Priority Data

Dec. 12, 2012 (JP) ................................. 2012-271640

(51) Int. Cl.
*G01B 7/30* (2006.01)
*G01D 5/244* (2006.01)

(52) U.S. Cl.
CPC .............. *G01B 7/30* (2013.01); *G01D 5/244* (2013.01)

(58) Field of Classification Search
CPC ........................................................ G01B 7/30
USPC ........................................................ 702/151
See application file for complete search history.

(56) References Cited

U.S. PATENT DOCUMENTS 7,119,532 B2   10/2006  Nihei et al.
7,218,100 B1    5/2007  Matsumoto et al.
7,659,713 B2    2/2010  Nakata et al.
7,969,147 B2    6/2011  Hatanaka et al.
9,523,573 B2 *  12/2016  Takaki ................... G01D 5/244
2002/0111763 A1  8/2002  Koga
2002/0124663 A1  9/2002  Tokumoto et al.
(Continued)

FOREIGN PATENT DOCUMENTS

EP      1018466 A2     7/2000
EP    1 684 051 A1     7/2006
(Continued)

OTHER PUBLICATIONS

Mar. 4, 2016 Office Action issued in U.S. Appl. No. 14/104,408.
(Continued)

*Primary Examiner* — Bryan Bui
(74) *Attorney, Agent, or Firm* — Oliff PLC

(57) ABSTRACT

In a rotation angle detection device, when a condition that two sensors among three magnetic sensors sense one and the same magnetic pole for three consecutive sampling periods is satisfied, a rotation angle is computed based on output signals from the two sensors, sampled at three sampling timings. When the output signals sampled at the three sampling timings satisfy a prescribed requirement, an angular width error correction value corresponding to the magnetic pole sensed by the two sensors and amplitudes are computed, and stored in association with the magnetic pole. If the condition is not satisfied, the rotation angle is computed based on the information stored in a memory and the output signals from two sensors among the three magnetic sensors, the two magnetic sensors including one of the three magnetic sensors, which detects the magnetic pole of which the angular width error correction value is stored in the memory.

3 Claims, 18 Drawing Sheets

(56) References Cited

U.S. PATENT DOCUMENTS

| | | |
|---|---|---|
| 2003/0042894 A1 | 3/2003 | Waffenschmidt |
| 2004/0210366 A1 | 10/2004 | Tomita |
| 2005/0052348 A1 | 3/2005 | Yamazaki et al. |
| 2005/0150712 A1 | 7/2005 | Tokumoto |
| 2005/0242765 A1 | 11/2005 | Ta et al. |
| 2007/0107977 A1 | 5/2007 | Shibata |
| 2008/0035411 A1 | 2/2008 | Yamashita et al. |
| 2008/0047775 A1 | 2/2008 | Yamazaki |
| 2008/0052562 A1 | 2/2008 | Kameya et al. |
| 2008/0167780 A1 | 7/2008 | Suzuki et al. |
| 2009/0105909 A1 | 4/2009 | Yamaguchi |
| 2009/0190283 A1 | 7/2009 | Hammerschmidt et al. |
| 2009/0206827 A1 | 8/2009 | Aimuta et al. |
| 2009/0230968 A1 | 9/2009 | Bittar et al. |
| 2009/0240389 A1 | 9/2009 | Nomura et al. |
| 2010/0045227 A1 | 2/2010 | Ura et al. |
| 2011/0022271 A1 | 1/2011 | Ueda et al. |
| 2011/0181292 A1 | 7/2011 | Oowada |
| 2012/0031697 A1 | 2/2012 | Matsuda |
| 2012/0109562 A1 | 5/2012 | Yabuguchi et al. |
| 2012/0143563 A1 | 6/2012 | Ueda |
| 2012/0158340 A1 | 6/2012 | Ueda |
| 2012/0158341 A1 | 6/2012 | Ueda et al. |
| 2012/0182008 A1* | 7/2012 | Ueda ............. G01D 5/145 324/207.25 |
| 2012/0182009 A1* | 7/2012 | Ueda ............. G01D 5/145 324/207.25 |
| 2012/0273290 A1 | 11/2012 | Kawano et al. |
| 2012/0274260 A1 | 11/2012 | Takahashi et al. |
| 2012/0319680 A1* | 12/2012 | Ueda ............. G01D 5/2451 324/207.25 |
| 2013/0035896 A1* | 2/2013 | Ueda ............. G01D 5/2449 702/151 |

FOREIGN PATENT DOCUMENTS

| | | |
|---|---|---|
| EP | 1108987 A1 | 6/2011 |
| EP | 2 466 268 A2 | 6/2012 |
| EP | 2 477 004 A1 | 7/2012 |
| JP | 2002-213944 A | 7/2002 |
| JP | 2006-078392 A | 3/2006 |
| JP | 2007-139739 A | 6/2007 |
| JP | A-2008-026297 | 2/2008 |
| JP | 2008-241411 A | 10/2008 |
| JP | 2008-286709 A | 11/2008 |
| JP | 2010-048760 A | 3/2010 |
| JP | 2010-110147 A | 5/2010 |

OTHER PUBLICATIONS

Apr. 29, 2014 Extended European Search Report issued in European Patent Application No. 13196422.3.
May 9, 2014 Extended European Search Report issued in European Patent Application No. 13196425.8.
Apr. 29, 2014 Extended European Search Report issued in European Patent Application No. 13196421.5.
Apr. 29, 2014 Extended European Search Report issued in European Patent Application No. 13196424.9.
Apr. 29, 2014 Extended European Search Report issued in European Patent Application No. 13196423.1.
Apr. 22, 2016 Office Action issued in U.S. Appl. No. 14/104,322.
Apr. 4, 2014 Extended European Search Report issued in European Patent Application No. 11193347.9.
Jul. 3, 2014 Notice of Reasons for Rejection Issued in Japanese Patent Application No. 2010-279440.
U.S. Pat. No. 9,121,729 to Ueda issued on Sep. 1, 2015.
Jun. 3, 2015 Office Action issued in U.S. Appl. No. 14/104,510.
Aug. 27, 2015 Office Action issued in U.S. Appl. No. 14/104,408.
U.S. Appl. No. 14/104,408 to Takaki et al., filed Dec. 12, 2013.
U.S. Appl. No. 14/104,510 to Takaki et al., filed Dec. 12, 2013.
U.S. Appl. No. 14/104,647 to Takaki et al., filed Dec. 12, 2013.
U.S. Appl. No. 14/104,322 to Kariatsumari et al., filed Dec. 12, 2013.
Dec. 30, 2015 Office Action issued in U.S. Appl. No. 14/104,510.
Oct. 11, 2016 Office Action issued in U.S. Appl. No. 14/104,510.
Jul. 15, 2016 Office Action issued in U.S. Appl. No. 14/104,647.

* cited by examiner

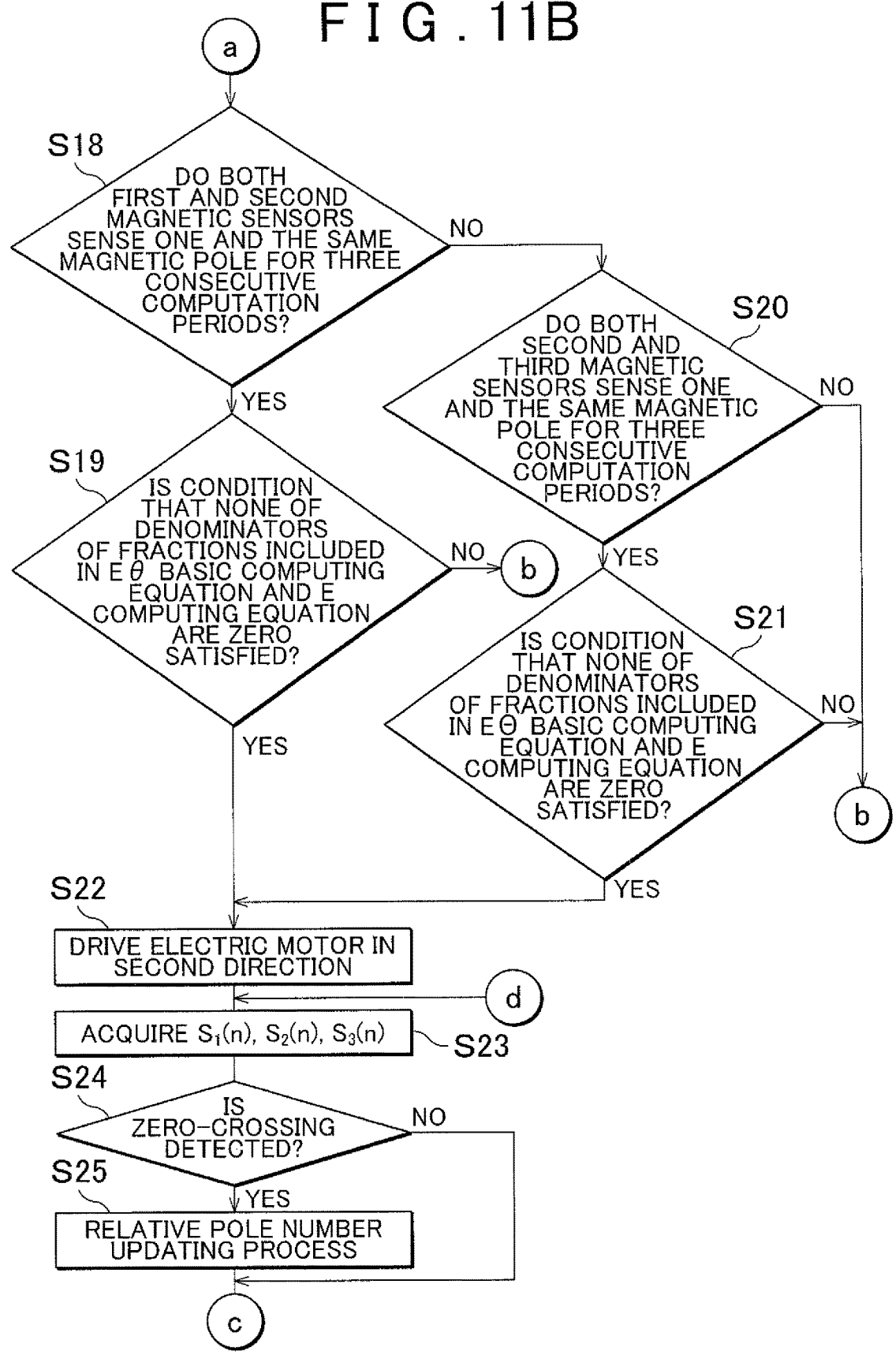

FIG. 12

| RELATIVE POLE NUMBER | E |
|---|---|
| 1 | |
| 2 | |
| 3 | |
| ⋮ | ⋮ |
| 7 | |
| 8 | | e1 brackets the above.

| RELATIVE POLE NUMBER | $A_1$ |
|---|---|
| 1 | |
| 2 | |
| 3 | |
| ⋮ | ⋮ |
| 7 | |
| 8 | | e2 brackets the above.

| RELATIVE POLE NUMBER | $A_2$ |
|---|---|
| 1 | |
| 2 | |
| 3 | |
| ⋮ | ⋮ |
| 7 | |
| 8 | | e3 brackets the above.

| RELATIVE POLE NUMBER | $A_3$ |
|---|---|
| 1 | |
| 2 | |
| 3 | |
| ⋮ | ⋮ |
| 7 | |
| 8 | | e4 brackets the above.

e5: $r1[n-k] \sim r1[n]$ e6: $r2[n-k] \sim r2[n]$ e7: $r3[n-k] \sim r3[n]$

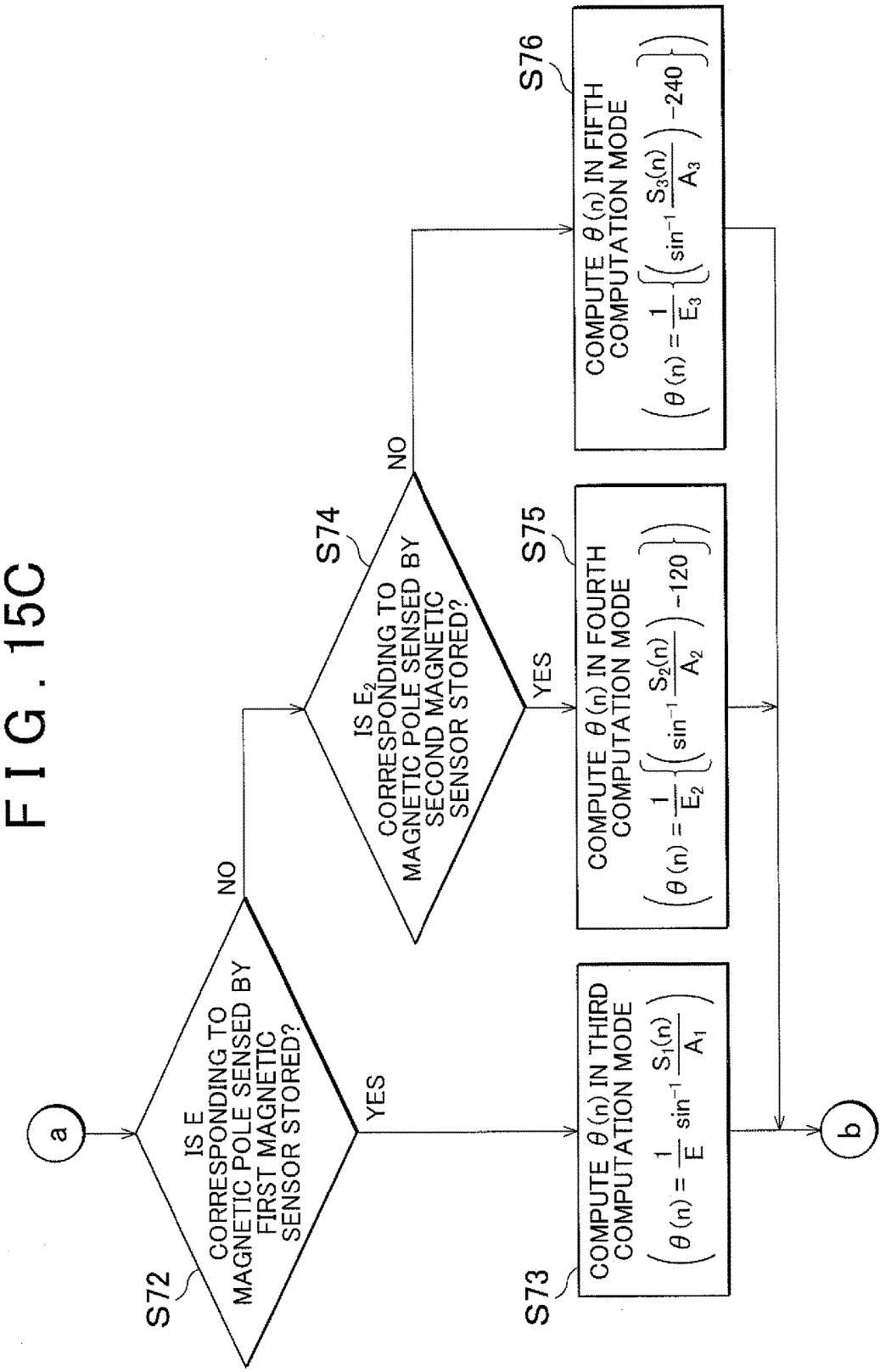

PRIOR ART

ROTATION ANGLE DETECTION DEVICE

INCORPORATION BY REFERENCE

The disclosure of Japanese Patent Application No. 2012-271640 filed on Dec. 12, 2012 including the specification, drawings and abstract is incorporated herein by reference in its entirety.

BACKGROUND OF THE INVENTION

1. Field of the Invention

The invention relates to a rotation angle detection device that detects a rotation angle of a rotary body.

2. Description of the Related Art

As a rotation angle detection device that detects a rotation angle of a rotary body, there has been known a rotation angle detection device that detects a rotation angle of a rotor of a brushless motor with the use of a detection rotor that rotates in accordance with the rotation of the brushless motor. Specifically, as illustrated in FIG. 16, a detection rotor 201 (hereinafter, referred to as "rotor 201") includes a cylindrical magnet 202 having a plurality of magnetic pole pairs corresponding to magnetic pole pairs formed in a rotor of a brushless motor. Two magnetic sensors 221, 222 are arranged around the rotor 201 at a predetermined angular interval around the rotation central axis of the rotor 201. The magnetic sensors 221, 222 respectively output sinusoidal signals having a predetermined phase difference. On the basis of the two sinusoidal signals, a rotation angle of the rotor 201 (a rotation angle of the brushless motor) is detected.

In this example, the magnet 202 has five magnetic pole pairs. That is, the magnet 202 has ten magnetic poles arranged at equal angular intervals. The magnetic poles are arranged at angular intervals of 36° (180° in electrical angle) around the rotation central axis of the rotor 201. Further, the two magnetic sensors 221, 222 are arranged at an angular interval of 18° (90° in electrical angle) around the rotation central axis of the rotor 201.

The direction indicated by an arrow in FIG. 16 is defined as the forward rotation direction of the detection rotor 201. The rotation angle of the rotor 201 increases as the rotor 201 is rotated in the forward direction, whereas the rotation angle of the rotor 201 decreases as the rotor 201 is rotated in the reverse direction. The magnetic sensors 221, 222 output sinusoidal signals $S_1$, $S_2$, respectively. As illustrated in FIG. 17, one period of each of the sinusoidal signals $S_1$, $S_2$ corresponds to a duration in which the rotor 201 rotates an angle of 72° (360° in electrical angle) corresponding to one magnetic pole pair.

The angular range corresponding to one rotation of the rotor 201 is divided into five sections corresponding to the five magnetic pole pairs, a start position of each section is defined as 0°, and an end position of each section is defined as 360°. A rotation angle of the rotor 201 expressed under the above-described conditions is an electrical angle θ of the rotor 201. In this case, the first magnetic sensor 221 outputs an output signal of $S_1 = A_1 \cdot \sin\theta$, and the second magnetic sensor 222 outputs an output signal of $S_2 = A_2 \cdot \cos\theta$. Each of $A_1$ and $A_2$ represents an amplitude. If the amplitude $A_1$ of the output signal $S_1$ and the amplitude $A_2$ of the output signal $S_2$ are assumed to be equal to each other, the electrical angle θ of the rotor 201 is obtained with the use of both the output signals $S_1$, $S_2$ based on the following expression.

$$\theta = \tan^{-1}(\sin\theta/\cos\theta)$$
$$= \tan^{-1}(S_1/S_2)$$

The thus obtained electrical angle θ is used to control the brushless motor. Refer to, for example, Japanese Patent Application Publication No. 2008-26297 (JP 2008-26297 A).

In the above-described conventional rotation angle detection device, the rotation angle θ is computed on the assumption that the amplitudes $A_1$, $A_2$ of the output signals $S_1$, $S_2$ output from the magnetic sensors 221, 222 are equal to each other. However, the amplitudes $A_1$, $A_2$ of the output signals $S_1$, $S_2$ vary depending on variations of the temperature characteristics of the magnetic sensors 221, 222 and temperature changes. Therefore, an error may be caused in detection of a rotation angle of the rotor due to variations of the temperature characteristics of the magnetic sensors 221, 222 and temperature changes.

SUMMARY OF THE INVENTION

One object of the invention is to provide a rotation angle detection device that is able to detect a rotation angle with a high degree of accuracy.

A rotation angle detection device according to an aspect of the invention includes: a multipolar magnet that rotates in accordance with rotation of a rotary body, and that has a plurality of magnetic poles; three magnetic sensors that respectively output sinusoidal signals having a predetermined phase difference in accordance with rotation of the multipolar magnet; a sampling unit that samples an output signal from each of the magnetic sensors at prescribed timings; a first computation unit that computes a rotation angle of the rotary body based on the output signals from two magnetic sensors among the three magnetic sensors, the output signals being sampled at three sampling timings, when a condition that both the two magnetic sensors among the three magnetic sensors sense one and the same magnetic pole for three consecutive sampling periods is satisfied, and computes information regarding a magnetic pole width of the magnetic pole sensed by the two magnetic sensors and information regarding amplitudes of the output signals from the two magnetic sensors and stores the information regarding the magnetic pole width and the information regarding the amplitudes in association with the magnetic pole sensed by the two magnetic sensors, at all times or when the output signals sampled at the three sampling timings satisfy a prescribed requirement; and a second computation unit that computes the rotation angle of the rotary body based on the information stored by the first computation unit and the output signals from two magnetic sensors among the three magnetic sensors, the two magnetic sensors including one of the three magnetic sensors, which senses the magnetic pole associated with the stored information regarding the magnetic pole width, when the condition is not satisfied.

According to the above-described aspect, the rotation angle of the rotary body is computed based on the output signals from two magnetic sensors among the three magnetic sensors, the output signals being sampled at three sampling timings, when the condition that both the two magnetic sensors among the three magnetic sensors sense one and the same magnetic pole for three consecutive sampling periods is satisfied. Therefore, it is possible to compute the rotation angle with a high degree of accuracy.

On the other hand, when the above-described condition is not satisfied, the rotation angle of the rotary body is computed based on the information stored by the first computation unit and the output signals from two magnetic sensors among the three magnetic sensors, the two magnetic sensors including one of the three magnetic sensors, which senses the magnetic pole associated with the stored information regarding the magnetic pole width. Therefore, it is possible to compute the rotation angle at an accuracy close to the accuracy achieved by the first computation unit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 11B is a flowchart showing part of the procedure of the rotation angle computing process based on forced rotation in step S1 in FIG. 10;

FIG. 12 is a schematic diagram showing part of the contents of a memory in a torque computation ECU;

FIG. 15C is a flowchart showing part of the procedure of the normal rotation angle computing process in step S2 in FIG. 10;

DETAILED DESCRIPTION OF EMBODIMENTS

Figure 1:
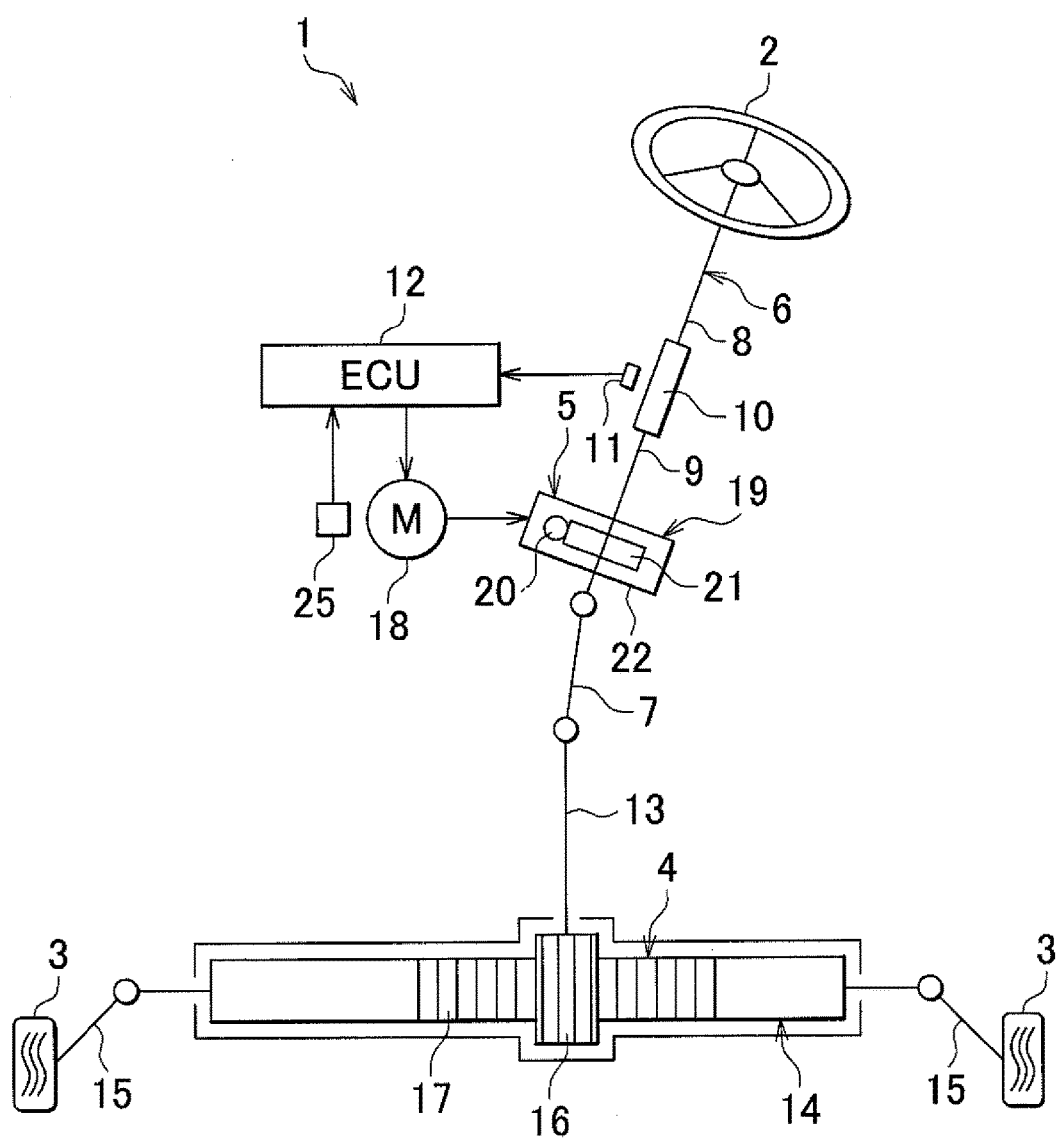
FIG. 1 is a schematic view illustrating the schematic configuration of an electric power steering system to which a rotation angle detection device according to an embodiment of the invention is applied.

Hereinafter, embodiments of the invention will be described with reference to the accompanying drawings. As illustrated in FIG. 1, an electric power steering system 1 includes a steering wheel 2, which serves as a steering member used to steer a vehicle, a steered mechanism 4 that steers steered wheels 3 in accordance with the rotation of the steering wheel 2, and a steering assist mechanism 5 used to assist a driver in performing a steering operation. The steering wheel 2 and the steered mechanism 4 are mechanically connected to each other via a steering shaft 6 and an intermediate shaft 7.

The steering shaft 6 includes an input shaft 8 connected to the steering wheel 2 and an output shaft 9 connected to the intermediate shaft 7. The input shaft 8 and the output shaft 9 are connected to each other via a torsion bar 10 so as to be rotatable relative to each other on the same axis. That is, when the steering wheel 2 is rotated, the input shaft 8 and the output shaft 9 rotate in the same direction while rotating relative to each other.

A torque sensor (torque detection device) 11, to which a rotation angle detection device according to an embodiment of the invention is applied, is arranged around the steering shaft 6. The torque sensor 11 detects a steering torque applied to the steering wheel 2 on the basis of a relative rotational displacement between the input shaft 8 and the output shaft 9. The steering torque detected by the torque sensor 11 is input into an electronic control unit 12 for motor control (hereinafter, referred to as "motor control ECU 12").

The steered mechanism 4 is formed of a rack-and-pinion mechanism including a pinion shaft 13 and a rack shaft 14 that serves as a steered shaft. The steered wheels 3 are connected to respective end portions of the rack shaft 14 via tie rods 15 and knuckle arms (not illustrated). The pinion shaft 13 is connected to the intermediate shaft 7. The pinion shaft 13 rotates in accordance with steering of the steering wheel 2. A pinion 16 is connected to a distal end of the pinion shaft 13.

The rack shaft 14 linearly extends along the lateral direction of the vehicle (the direction orthogonal to the direction in which the vehicle travels straight ahead). A rack 17 that meshes with the pinion 16 is formed at an axially intermediate portion of the rack shaft 14. The pinion 16 and the rack 17 convert the rotation of the pinion shaft 13 into an axial movement of the rack shaft 14. By moving the rack shaft 14 in the axial direction, the steered wheels 3 are steered.

When the steering wheel 2 is steered (rotated), the rotation is transmitted to the pinion shaft 13 via the steering shaft 6 and the intermediate shaft 7. The rotation of the pinion shaft 13 is converted into an axial movement of the rack shaft 14 by the pinion 16 and the rack 17. As a result, the steered wheels 3 are steered. The steering assist mechanism 5 includes an electric motor 18 that generates steering assist force and a speed-reduction mechanism 19 that transmits torque output from the electric motor 18 to the steered mechanism 4. The electric motor 18 is formed of a three-phase brushless motor in the present embodiment. The speed-reduction mechanism 19 is formed of a worm gear mechanism including a worm shaft 20 and a worm wheel 21 that meshes with the worm shaft 20. The speed-reduction mechanism 19 is housed in a gear housing 22 that serves as a transmission mechanism housing.

The worm shaft 20 is driven to be rotated by the electric motor 18. The worm wheel 21 is connected to the steering shaft 6 so as to be rotatable in the same direction as the rotation direction of the steering shaft 6. The worm wheel 21 is driven to be rotated by the worm shaft 20. When the worm shaft 20 is driven to be rotated by the electric motor 18, the worm wheel 21 is driven to be rotated, and the steering shaft 6 rotates. The rotation of the steering shaft 6 is transmitted to the pinion shaft 13 via the intermediate shaft 7. The rotation of the pinion shaft 13 is converted into an axial movement of the rack shaft 14. As a result, the steered wheels 3 are steered. That is, when the worm shaft 20 is driven to be rotated by the electric motor 18, the steered wheels 3 are steered.

Figure 2:
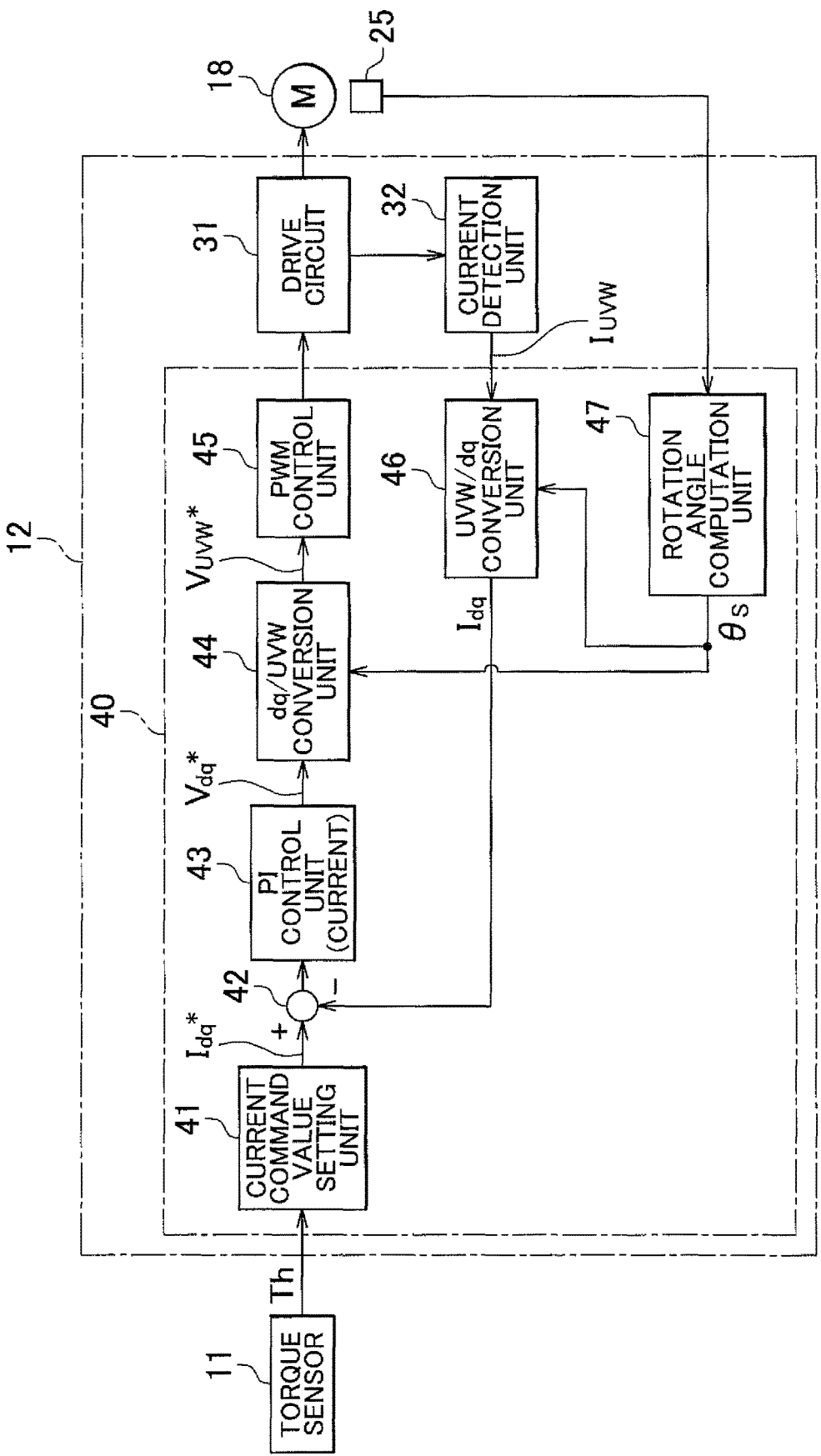
FIG. 2 is a schematic diagram illustrating the electrical configuration of a motor control ECU.

A rotation angle of a rotor of the electric motor 18 (a rotor rotation angle) is detected by a rotation angle sensor 25 such as a resolver. A signal output from the rotation angle sensor 25 is input into the motor control ECU 12. The electric motor 18 is controlled by the motor control ECU 12 that serves as a motor control unit. FIG. 2 is a schematic diagram illustrating the electrical configuration of the motor control ECU 12.

The motor control ECU 12 realizes appropriate steering assistance suited to a steering state, by driving the electric motor 18 on the basis of a steering torque Th detected by the torque sensor 11. The motor control ECU 12 includes a microcomputer 40, a drive circuit (inverter circuit) 31 that is controlled by the microcomputer 40 and that supplies electric power to the electric motor 18, and a current detection unit 32 that detects a motor current passing through the electric motor 18.

Figure 3:
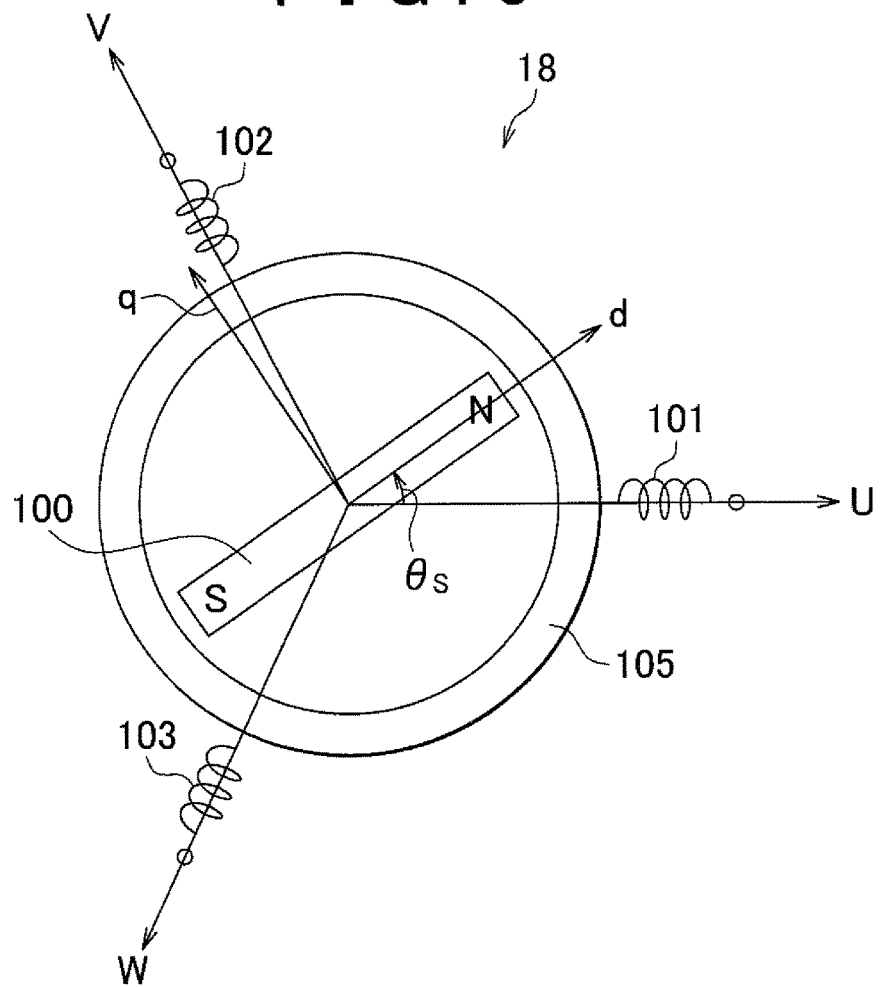
FIG. 3 is a schematic diagram schematically illustrating the configuration of an electric motor.

The electric motor 18 is, for example, a three-phase brushless motor, and includes a rotor 100, which serves as a field magnet, and a stator 105 provided with U-phase, V-phase, and W-phase stator coils 101, 102, 103, as schematically illustrated in FIG. 3. The electric motor 18 may be an electric motor of an inner rotor type, in which a stator is arranged outside a rotor so as to face the rotor, or may be an electric motor of an outer rotor type, in which a stator is arranged inside a tubular rotor so as to face the rotor.

A UVW coordinate system that is a three-phase fixed coordinate system is defined, in which a U-axis, a V-axis, and a W-axis are set to the respective directions of the U-phase stator coil 101, the V-phase stator coil 102 and the W-phase stator coil 13. A dq coordinate system (an actual rotating coordinate system) that is a two-phase rotating coordinate system is defined, in which a d-axis that is a magnetic pole axis is set to the magnetic pole direction of the rotor 100 and a q-axis that is a torque axis is set to the direction orthogonal to the d-axis within a rotary plane of the rotor 100. The dq coordinate system is a rotating coordinate system that rotates together with the rotor 100. In the dq coordinate system, because only a q-axis current contributes to generation of torque of the rotor 100, a d-axis current is set to zero and the q-axis current is controlled on the basis of a desired torque. A rotation angle (electrical angle) θ-S of the rotor 100 is a rotation angle of the d-axis with respect to the U-axis. The dq coordinate system is an actual rotating coordinate system that rotates in accordance with the rotor angle θ-S. With the use of the rotor angle θ-S, coordinate conversion between the UVW coordinate system and the dq coordinate system can be executed.

The microcomputer 40 includes a CPU and memories (a ROM, a RAM, a non-volatile memory, etc.), and is configured to function as a plurality of functional processing units by executing predetermined programs. The functional processing units include a current command value setting unit 41, a current deviation computation unit 42, a PI (Proportional Integral) control unit 43, a dq/UVW conversion unit 44, a PWM (Pulse Width Modulation) control unit 45, a UVW/dq conversion unit 46, and a rotation angle computation unit 47.

The rotation angle computation unit 47 computes a rotor rotation angle (electrical angle) (hereinafter, referred to as "rotor angle $θ_S$") of the electric motor 18 on the basis of a signal output from the rotation angle sensor 25. The current command value setting unit 41 sets current values, which are values of currents that should be passed through coordinate axes of the dq coordinate system, as current command values. Specifically, the current command value setting unit 41 sets a d-axis current command value $I_d^*$ and a q-axis current command value $I_q^*$ (hereinafter, the d-axis current command value $I_d^*$ and the q-axis current command value $I_q^*$ will be collectively referred to as "two-phase current command values $I_{dq}^*$" where appropriate). More specifically, the current command value setting unit 41 sets the q-axis current command value $I_q^*$ to a significant value, whereas it sets the d-axis current command value $I_d^*$ to zero. More specifically, the current command value setting unit 41 sets the q-axis current command value $I_q^*$ on the basis of the detected steering torque Th detected by the torque sensor 11.

Figure 4:
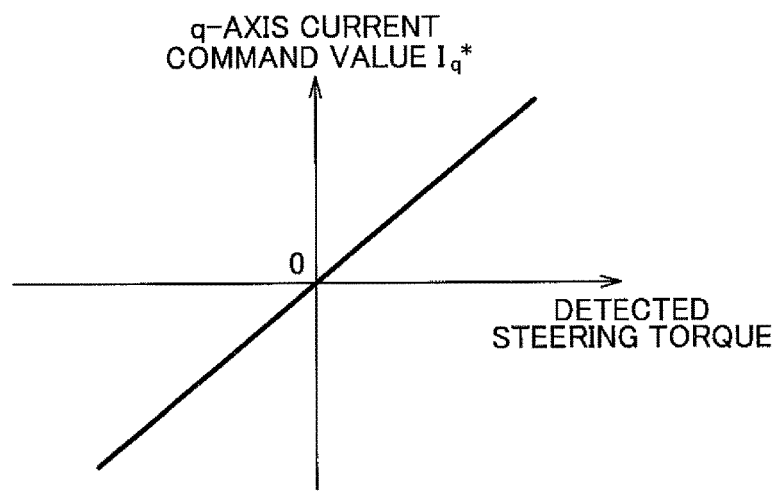
FIG. 4 is a graph illustrating an example of a manner of setting a q-axis current command value $I_q^*$ with respect to a detected steering torque Th.

An example of a manner of setting the q-axis current command value $I_q^*$ with respect to the detected steering torque Th is shown in FIG. 4. With regard to the detected steering torque Th, for example, a torque for steering to the right takes a positive value, and a torque for steering to the left takes a negative value. The q-axis current command value $I_q^*$ takes a positive value when an operation assist force for steering to the right should be generated by the electric motor 18, and takes a negative value when an operation assist force for steering to the left should be generated by the electric motor 18. The q-axis current command value $I_q^*$ with respect to a positive value of the detected steering torque Th takes a positive value, and the q-axis current command value $I_q^*$ with respect to a negative value of the detected steering torque Th takes a negative value. When the detected steering torque Th is zero, the q-axis current command value $I_q^*$ is zero. The q-axis current command value $I_q^*$ is set such that the absolute value of the q-axis current command value $I_q^*$ increases as the absolute value of the detected steering torque Th increases.

The two-phase current command values $I_{dq}^*$ set by the current command value setting unit 41 are provided to the current deviation computation unit 42. The current detection unit 32 detects a U-phase current $I_U$, a V-phase current $I_V$, and a W-phase current $I_w$ for the electric motor 18 (hereinafter, the U-phase current $I_U$, the V-phase current $I_V$, and the W-phase current $I_w$ will be collectively referred to as "three-phase detected currents $I_{UVW}$" where appropriate). The three-phase detected currents $I_{UVW}$ detected by the current detection unit 32 are provided to the UVW/dq conversion unit 46.

The UVW/dq conversion unit 46 executes coordinate conversion from the three-phase detected currents $I_{UVW}$ (the U-phase current $I_U$, the V-phase current $I_V$, and the W-phase current $I_w$) of the UVW coordinate system detected by the current detection unit 32, into two-phase detected currents $I_d$, $I_q$ of the dq coordinate system (hereinafter, the two-phase detected currents $I_d$, $I_q$ will be collectively referred to as "two-phase detected currents $I_{dq}$" where appropriate). The rotor angle $\theta_S$ computed by the rotation angle computation unit 47 is used for this coordinate conversion.

The current deviation computation unit 42 computes deviations between the two-phase current command values $I_{dq}*$ set by the current command value setting unit 41 and the two-phase detected currents $I_{dq}$ provided from the UVW/dq conversion unit 46. Specifically, the current deviation computation unit 42 computes a deviation of the d-axis detected current $I_d$ with respect to the d-axis current command value $I_d*$ and a deviation of the q-axis detected current $I_q$ with respect to the q-axis current command value $I_q*$. These deviations are provided to the PI control unit 43.

The PI control unit 43 generates two-phase voltage command values $V_{dq}*$ (the d-axis voltage command value $V_d*$ and the q-axis voltage command value $V_q*$), which are values of voltages that should be applied to the electric motor 18, by executing a PI computation on the current deviations computed by the current deviation computation unit 42. The two-phase voltage command values $V_{dq}*$ are provided to the dq/UVW conversion unit 44. The dq/UVW conversion unit 44 executes coordinate conversion from the two-phase voltage command values $V_{dq}*$ into three-phase voltage command values $V_{UVW}*$. The rotor angle $\theta_S$ computed by the rotation angle computation unit 47 is used for this coordinate conversion. The three-phase voltage command values $V_{UVW}*$ consist of a U-phase voltage command value $V_U*$, a V-phase voltage command value $V_V*$, and a W-phase voltage command value $V_w*$. The three-phase voltage command values $V_{UVW}*$ are provided to the PWM control unit 45.

The PWM control unit 45 generates a U-phase PWM control signal, a V-phase PWM control signal, and a W-phase PWM control signal having duty ratios corresponding to the U-phase voltage command value $V_U*$, the V-phase voltage command value $V_V*$, and the W-phase voltage command value $V_w*$, respectively, and provides these control signals to the drive circuit 31. The drive circuit 31 is formed of an inverter circuit with three phases corresponding to the U-phase, the V-phase, and the W-phase. When power elements constituting the inverter circuit are controlled by the PWM control signals provided from the PWM control unit 45, voltages corresponding to the three-phase voltage command values $V_{UVW}*$ are applied to the U-phase stator coil 101, the V-phase stator coil 102 and the W-phase stator coil 103 of the electric motor 18.

Figure 5:
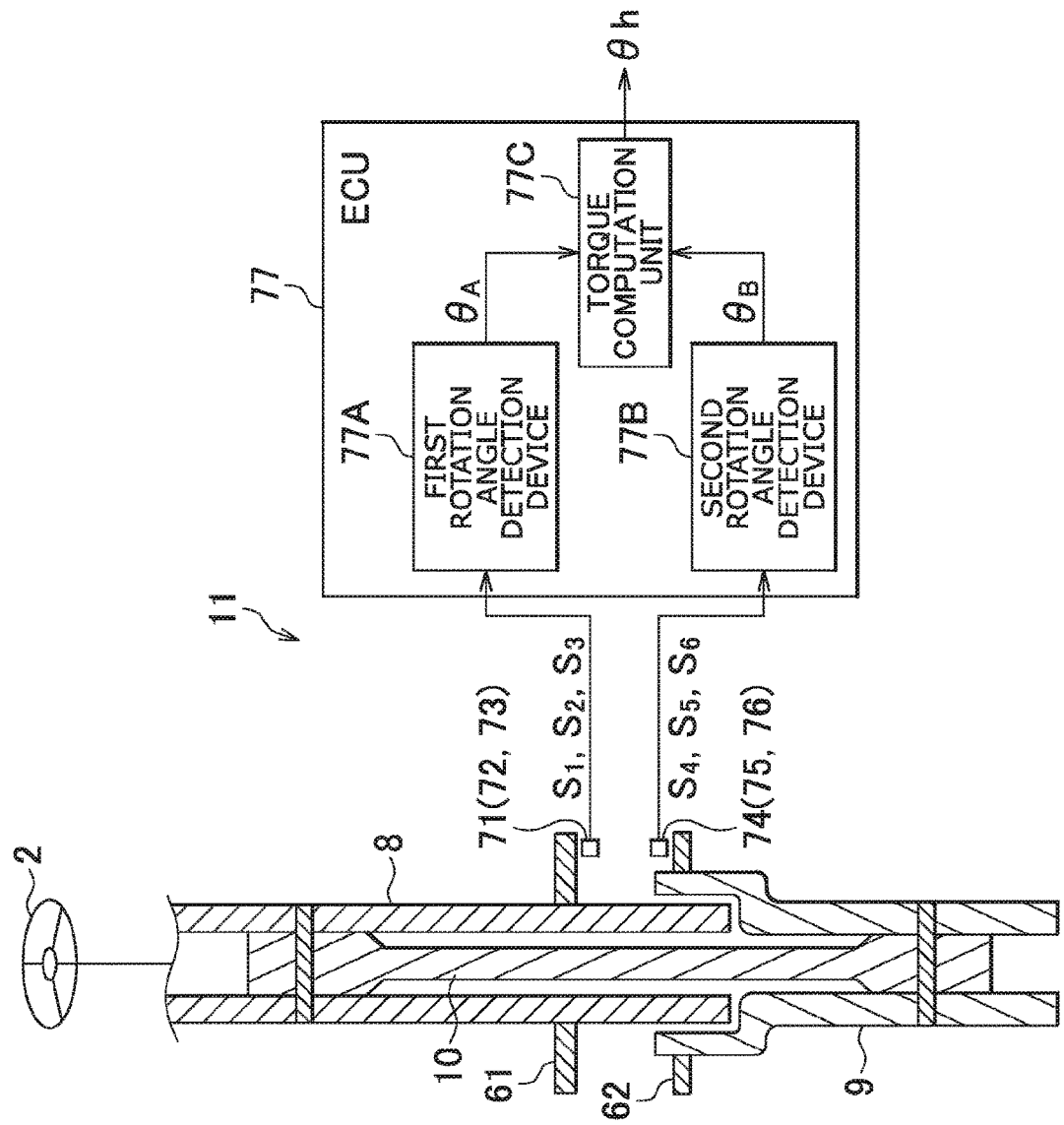
FIG. 5 is a schematic view schematically illustrating the configuration of a torque sensor.

The current deviation computation unit 42 and the PI control unit 43 constitute a current feedback controller. Due to the action of the current feedback controller, motor currents passing through the electric motor 18 are controlled so as to approach the two-phase current command values $I_{dq}*$ set by the current command value setting unit 41. FIG. 5 is a schematic view schematically showing the configuration of the torque sensor 11.

An annular first magnet (a multipolar magnet) 61 is connected to the input shaft 8 so as to be rotatable together with the input shaft 8. Three magnetic sensors 71, 72, 73 that respectively output sinusoidal signals having a phase difference in accordance with the rotation of the first magnet 61 are arranged below the first magnet 61. An annular second magnet (a multipolar magnet) 62 is connected to the output shaft 9 so as to be rotatable together with the output shaft 9. Three magnetic sensors 74, 75, 76 that respectively output sinusoidal signals having a phase difference in accordance with the rotation of the second magnet 62 are arranged above the second magnet 62.

The output signals $S_1$ to $S_6$ from the respective magnetic sensors 71 to 76 are input into a torque computation ECU 77 used to compute a steering torque that is applied to the input shaft 8. A power supply for the torque computation ECU 77 is turned on when an ignition key is turned on. When the ignition key is turned off, an ignition key off operation signal indicating that the ignition key is turned off is input into the torque computation ECU 77. A magnetic sensor including an element having electrical characteristics that vary due to the action of a magnetic force, for example, a Hall element or a magnetoresistive element (a MR element) may be used as each of the magnetic sensors. In the present embodiment, a Hall element is used as each of the magnetic sensors.

The magnets 61, 62, the magnetic sensors 71 to 76, and the torque computation ECU 77 constitute the torque sensor 11. The torque computation ECU 77 includes a microcomputer. The microcomputer is provided with a CPU and memories (a ROM, a RAM, a nonvolatile memory, etc.), and functions as a plurality of functional processing units by executing predetermined programs. The functional processing units include a first rotation angle detection device 77A, a second rotation angle detection device 77B, and a torque computation unit 77C.

The first rotation angle detection device 77A computes the rotation angle (an electrical angle $\theta_A$) of the input shaft 8 on the basis of the output signals $S_1$, $S_2$, $S_3$ from the three magnetic sensors 71, 72, 73. The second rotation angle detection device 77B computes the rotation angle (an electrical angle $\theta_B$) of the output shaft 9 on the basis of the output signals $S_4$, $S_5$, $S_6$ from the three magnetic sensors 74, 75, 76. The torque computation unit 77C computes the steering torque Th applied to the input shaft 8 on the basis of the rotation angle $\theta_A$ of the input shaft 8 detected by the first rotation angle detection device 77A and the rotation angle $\theta_B$ of the output shaft 9 detected by the second rotation angle detection device 77B. Specifically, the steering torque Th is computed according to the following expression (1) where K is a spring constant of the torsion bar 10 and N is the number of magnetic pole pairs formed in each of the magnets 61, 62.

$$Th = \{(\theta_A - \theta_B)/N\} \times K \quad (1)$$

The first magnet 61, the magnetic sensors 71, 72, 73 and the first rotation angle detection device 77A detect the rotation angle $\theta_A$ of the input shaft 8. The second magnet 62, the magnetic sensors 74, 75, 76 and the second rotation angle detection device 77B detect the rotation angle $\theta_B$ of the output shaft 9. Because an operation of the first rotation angle detection device is the same as an operation of the second rotation angle detection device, only the operation of the first rotation angle detection device will be described below.

Figure 6:
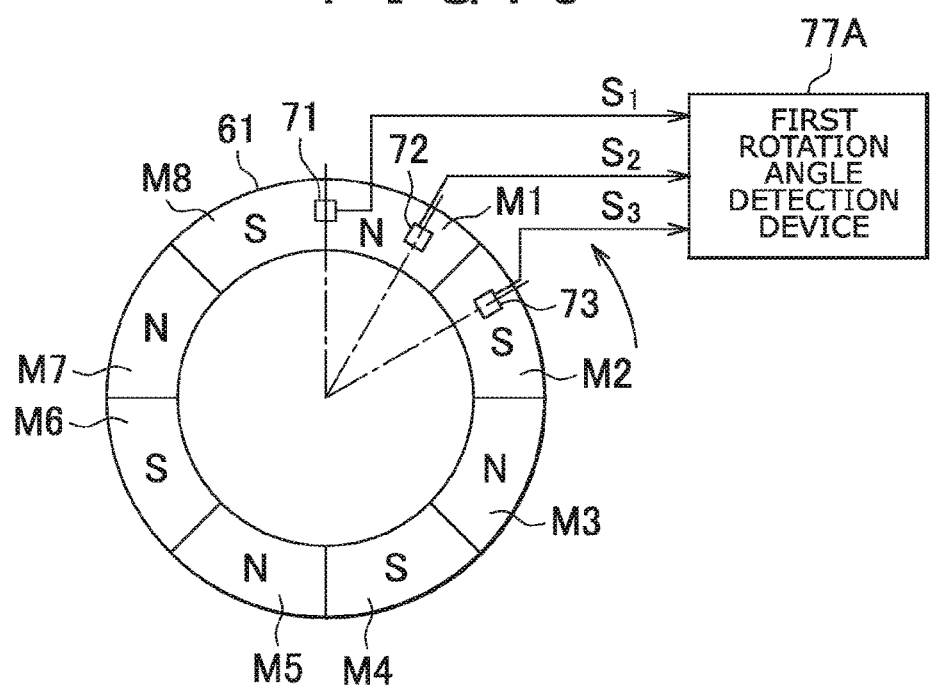
FIG. 6 is a schematic diagram illustrating the configuration of a first magnet and the arrangement of three magnetic sensors.

FIG. 6 is a schematic diagram illustrating the configuration of the first magnet 61 and the arrangement of the three magnetic sensors 71, 72, 73. The first magnet 61 has four magnetic pole pairs (M1, M2), (M3, M4), (M5, M6), (M7, M8) arranged at equal angular intervals in the circumferential direction. That is, the first magnet 61 has the eight magnetic poles M1 to M8 arranged at the equal angular intervals. The magnetic poles M1 to M8 are arranged at angular intervals (angular widths) of approximately 45° (approximately 180° in electrical angle) around the central axis of the input shaft 8. The magnitudes of magnetic forces of the magnetic poles M1 to M8 are substantially equal to each other.

The three magnetic sensors 71, 72, 73 are arranged so as to face a lower annular end face of the first magnet 61. In the following description, the magnetic sensor 71 will be referred to as a first magnetic sensor 71, the magnetic sensor 72 will be referred to as a second magnetic sensor 72, and the magnetic sensor 73 will be referred to as a third magnetic sensor 73 where appropriate. The first magnetic sensor 71 and the second magnetic sensor 72 are arranged at an angular interval of 120° in electrical angle around the central axis of the input shaft 8. The second magnetic sensor 72 and the third magnetic sensor 73 are arranged at an angular interval of 120° in electrical angle around the central axis of the input shaft 8. Therefore, the first magnetic sensor 71 and the third magnetic sensor 73 are arranged at an angular interval of 240° in electrical angle around the central axis of the input shaft 8.

Figure 7:
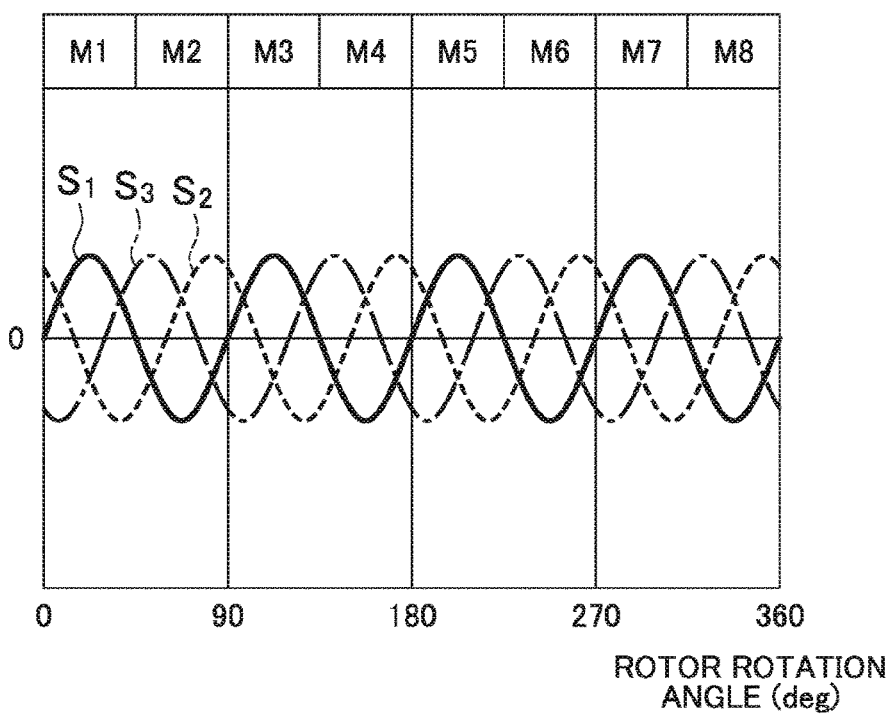
FIG. 7 is a schematic diagram illustrating waveforms of output signals from a first magnetic sensor, a second magnetic sensor and a third magnetic sensor.

The direction indicated by an arrow in FIG. 6 is defined as the forward rotation direction of the input shaft 8. The rotation angle of the input shaft 8 increases as the input shaft 8 is rotated in the forward direction, and the rotation angle of the input shaft 8 decreases as the input shaft 8 is rotated in the reverse direction. Sinusoidal signals $S_1$, $S_2$, $S_3$ are respectively output from the magnetic sensors 71, 72, 73 in accordance with rotation of the input shaft 8, as illustrated in FIG. 7. Note that a rotation angle (deg) on the abscissa axis in FIG. 7 represents a mechanical angle.

In the following description, the output signal $S_1$ from the first magnetic sensor 71 will be referred to as a first output signal $S_1$ or a first sensor value $S_1$, the output signal $S_2$ from the second magnetic sensor 72 will be referred to as a second output signal $S_2$ or a second sensor value $S_2$, and the output signal $S_3$ from the third magnetic sensor 73 will be referred to as a third output signal $S_3$ or a third sensor value $S_3$, where appropriate. In the following description, a rotation angle of the input shaft 8 will be denoted by $\theta$ instead of $\theta_A$, for convenience of explanation. If each of the output signals $S_1$, $S_2$, $S_3$ is a sinusoidal signal and a rotation angle of the input shaft 8 is $\theta$ (electrical angle), the output signal $S_1$ from the first magnetic sensor 71 is expressed by $S_1=A_1 \cdot \sin \theta$, the output signal $S_2$ from the second magnetic sensor 72 is expressed by $S_2=A_2 \cdot \sin(\theta+120)$, and the output signal $S_3$ from the third magnetic sensor 73 is expressed by $S_3=A_3 \cdot \sin(\theta+240)$. Each of $A_1$, $A_2$ and $A_3$ represents an amplitude. The phase difference between the first output signal $S_1$ and the second output signal $S_2$ is 120°. The phase difference between the second output signal $S_2$ and the third output signal $S_3$ is also 120°. Therefore, the phase difference between the first output signal $S_1$ and the third output signal $S_3$ is 240°.

A basic concept of a method of computing the rotation angle $\theta$ with the use of the first rotation angle detection device 77A will be described. The first rotation angle detection device 77A includes a rotation angle computation unit. The modes of computation of the rotation angle $\theta$ executed by the rotation angle computation unit include a first computation mode to a fifth computation mode. Each computation mode will be described below. The first computation mode is a computation mode that is applied when both the first and second magnetic sensors 71, 72 sense one and the same magnetic pole for three consecutive sampling periods (three consecutive computation periods). In the first computation mode, the rotation angle $\theta$ is computed on the basis of the output signals from the first and second magnetic sensors 71, 72, which are sampled at three sampling timings.

A phase difference (electrical angle) between the first output signal $S_1$ and the second output signal $S_2$ will be denoted by C. The number of the present sampling period (the number of the present computation period) will be denoted by (n), the number of the immediately preceding sampling period will be denoted by (n−1), and the number of the second preceding sampling period will be denoted by (n−2). A correction value used to correct a rotation angle computing error due to the variations of angular widths (magnetic pole widths, pitch widths) of the magnetic poles M1 to M8 will be referred to as an angular width error correction value (a magnetic pole width error correction value), and will be denoted by E.

When the phase difference C, the numbers of the sampling periods (n), (n−1), (n−2), and the angular width error correction value E are used, the first output signals $S_1$ sampled in the present sampling period, the immediately preceding sampling period, and the second preceding sampling period, and the second output signals $S_2$ sampled in the present sampling period, the immediately preceding sampling period, and the second preceding sampling period can be expressed by the following expressions (2a), (2b), (2c), (2d), (2e), (2f), respectively.

$$S_1(n)=A_1(n)\sin(E_1(n)\theta(n)) \tag{2a}$$

$$S_1(n-1)=A_1(n-1)\sin(E_1(n-1)\theta(n-1)) \tag{2b}$$

$$S_1(n-2)=A_1(n-2)\sin(E_1(n-2)\theta(n-2)) \tag{2c}$$

$$S_2(n)=A_2(n)\sin(E_2(n)\theta(n)+C) \tag{2d}$$

$$S_2(n-1)=A_2(n-1)\sin(E_2(n-1)\theta(n-1)+C) \tag{2e}$$

$$S_2(n-2)=A_2(n-2)\sin(E_2(n-2)\theta(n-2)+C) \tag{2f}$$

In the expressions (2a) to (2f), $E_1(x)$ is an angular width error correction value corresponding to a magnetic pole sensed by the first magnetic sensor 71 in an x-th computation period. $E_2(x)$ is an angular width error correction value corresponding to a magnetic pole sensed by the second magnetic sensor 72 in an x-th computation period.

If an angular width of a given magnetic pole is w (electrical angle), an angular width error $\theta_{err}$ (electrical angle) of this magnetic pole can be defined by the following expression (3).

$$\theta_{err}=w-180 \tag{3}$$

The angular width error correction value E for this magnetic pole can be defined by the following expression (4).

$$E=180/w=180/(\theta_{err}+180) \tag{4}$$

The angular width error correction value E for each magnetic pole is a piece of information regarding a magnetic pole width of the magnetic pole. Note that the piece of the information regarding the magnetic pole width of each magnetic pole may be an angular width w of the magnetic pole or an angular width error $\theta_{err}$ of the magnetic pole.

If C is a known quantity, the number of unknown quantities included in the six expressions expressed by the expressions (2a) to (2f) is 16. Because the number of the unknown quantities is greater than the number of the expressions, simultaneous equations constituted of the six expressions cannot be solved in this state. Therefore, in the present embodiment, by setting a short sampling interval (sampling period), variations of amplitudes due to temperature changes between three sampling timings are assumed to be non-existent. That is, on the assumption that amplitudes $A_1(n)$, $A_1(n-1)$ $A_1(n-2)$ of the output signals from the first magnetic sensor 71, which are sampled at three sampling timings, are equal to each other, the amplitudes $A_1(n)$, $A_1(n-1)$, $A_1(n-2)$ are expressed by $A_1$. Similarly, on the assumption that amplitudes $A_2(n)$, $A_2(n-1)$, $A_2(n-2)$ of the output signals from the second magnetic sensor 72, which are sampled at three sampling timings, are equal to each other, the amplitudes $A_2(n)$, $A_2(n-1)$, $A_2(n-2)$ are expressed by $A_2$.

When both the magnetic sensors 71, 72 sense one and the same magnetic pole at the three sampling timings, angular width error correction values $E_1(n)$, $E_1(n-1)$, $E_1(n-2)$, $E_2(n)$, $E_2(n-1)$, $E_2(n-2)$ included in the output signals from the magnetic sensors 71, 72, which are sampled at the three sampling timings, are equal to each other, and hence they are expressed by E. As a result, the expressions (2a) to (2f) can be expressed by the following expressions (5a) to (5f), respectively.

$$S_1(n) = A_1 \sin(E\theta(n)) \qquad (5a)$$

$$S_1(n-1) = A_1 \sin(E\theta(n-1)) \qquad (5b)$$

$$S_1(n-2) = A_1 \sin(E\theta(n-2)) \qquad (5c)$$

$$S_2(n) = A_2 \sin(E\theta(n) + C) \qquad (5d)$$

$$S_2(n-1) = A_2 \sin(E\theta(n-1) + C) \qquad (5e)$$

$$S_2(n-2) = A_2 \sin(E\theta(n-2) + C) \qquad (5f)$$

The number of unknown quantities ($A_1$, $A_2$, E, $\theta(n)$, $\theta(n-1)$, $\theta(n-2)$) included in these six expressions is six. That is, the number of the unknown quantities is equal to or smaller than the number of the expressions, and hence simultaneous equations constituted of the six expressions can be solved. Therefore, by solving the simultaneous equations constituted of the six expressions (5a) to (5f), the rotation angle $\theta(n)$ of the input shaft 8 can be computed.

Hereinafter, the case where the phase difference C between the sinusoidal signals output from the magnetic sensors 71, 72 is 120° will be described in detail. When the phase difference C is 120°, the six expressions (5a) to (5f) can be expressed by the following expressions (6a) to (6f), respectively.

$$S_1(n) = A_1 \sin(E\theta(n)) \qquad (6a)$$

$$S_1(n-1) = A_1 \sin(E\theta(n-1)) \qquad (6b)$$

$$S_1(n-2) = A_1 \sin(E\theta(n-2)) \qquad (6c)$$

$$S_2(n) = A_2 \sin(E\theta(n) + 120) \qquad (6d)$$

$$S_2(n-1) = A_2 \sin(E\theta(n-1) + 120) \qquad (6e)$$

$$S_2(n-2) = A_2 \sin(E\theta(n-2) + 120) \qquad (6f)$$

If $E\theta(n)$ is regarded as one unknown quantity, by solving simultaneous equations constituted of four expressions (6a), (6b), (6d), (6e) among the six expressions (6a) to (6f), $E\theta(n)$ can be expressed by the following expression (7) (hereinafter, referred to as "$E\theta$ basic arithmetic expression (7)").

$$E\theta[n] = \frac{1}{4}\cos^{-1}\left(1 - \frac{(3p_1^2 p_2^2 - 2p_1^2 - 2p_2^2 + p_1 p_2)^2}{2(p_1 - p_2)^2(p_1^2 + p_1 p_2 + p_2^2)}\right) - \qquad (7)$$

$$\frac{1}{4}\cos^{-1}\left(\frac{1}{2} - \frac{3}{2} \cdot \frac{p_1 p_2 + p_2^2}{p_1^2 + p_1 p_2 + p_2^2}\right)$$

where $$p_1 = \frac{S_1[n]}{S_1[n-1]} \qquad p_2 = \frac{S_2[n]}{S_2[n-1]}$$

By solving simultaneous equations constituted of the six expressions (6a) to (6f), the angular width error correction value E can be expressed by the following expression (8) (hereinafter, referred to as "E arithmetic expression (8)").

$$E = \frac{1}{240} \cdot \cos^{-1}\left(\frac{q_1^2 t^2 - 2q_1 q_2 t + q_2^2}{2t(S_1[n]S_2[n] - S_1[n-1]S_2[n-1])^2} - 1\right) \qquad (8)$$

where $$q_1 = S_1[n-1]^2 - S_1[n]^2$$

$$q_2 = S_2[n]^2 - S_2[n-1]^2$$

$$t = \frac{S_1[n]S_2[n]q_3 + S_1[n-1]S_2[n-1]q_4 + S_1[n-2]S_2[n-2]q_1}{S_1[n]S_2[n]q_5 + S_1[n-1]S_2[n-1]q_6 + S_1[n-2]S_2[n-2]q_2}$$

$$q_3 = S_1[n-2]^2 - S_1[n-1]^2$$

$$q_4 = S_1[n]^2 - S_1[n-2]^2$$

$$q_5 = S_2[n-1]^2 - S_2[n-2]^2$$

$$q_6 = S_2[n-2]^2 - S_2[n]^2$$

By dividing $E\theta(n)$ computed according to the $E\theta$ basic arithmetic expression (7) by the angular width error correction value E computed according to the E arithmetic expression (8), $\theta(n)$ can be obtained. That is, $\theta(n)$ can be obtained according to the following expression (9).

$$\theta(n) = E\theta(n)/E \qquad (9)$$

Note that, when at least one of the denominators of the fractions included in the expression (8) is zero, the angular width error correction value E cannot be computed according to the expression (8). Therefore, in the present embodiment, when at least one of the denominators of the fractions included in the expression (8) is zero, the immediately preceding computed angular width error correction value E is used as the present angular width error correction value E.

The case where at least one of the denominators of the fractions included in the expression (8) is zero is the case where at least one of the three conditions expressed by the following expressions (10), (11), (12) is satisfied.

$$S_1[n]S_2[n] - S_1[n-1]S_2[n-1] = 0 \qquad (10)$$

$$S_1[n]S_2[n]q_3 + S_1[n-1]S_2[n-1]q_4 + S_1[n-2]S_2[n-2]q_1 = 0 \qquad (11)$$

$$S_1[n]S_2[n]q_5 + S_1[n-1]S_2[n-1]q_6 + S_1[n-2]S_2[n-2]q_2 = 0 \qquad (12)$$

where
$q_1 = S_1[n-1]^2 - S_1[n]^2$
$q_2 = S_2[n]^2 - S_2[n-1]^2$
$q_3 = S_1[n-2]^2 - S_1[n-1]^2$
$q_4 = S_1[n]^2 - S_1[n-2]^2$
$q_5 = S_2[n-1]^2 - S_2[n-2]^2$
$q_6 = S_2[n-2]^2 - S_2[n]^2$ When at least one of the denominators of the fractions included in the Eθ basic arithmetic expression (7) is zero, Eθ(n) cannot be computed according to the Eθ basic arithmetic expression (7). In the present embodiment, when at least one of the denominators of the fractions included in the Eθ basic arithmetic expression (7) is zero, Eθ(n) is computed according to an arithmetic expression that differs from the Eθ basic arithmetic expression (7). Further, in the present embodiment, if Eθ(n) can be computed according to an arithmetic expression that is simpler than the Eθ basic arithmetic expression (7) although Eθ(n) can be computed according to the Eθ basic arithmetic expression (7), Eθ(n) is computed according to the arithmetic expression that is simpler than the basic Eθ arithmetic expression (7). In the present embodiment, the case where Eθ(n) can be computed more easily than using the basic Eθ arithmetic expression (7) is the case where $S_2(n)=0$ or the case where $S_1(n)=0$.

In the present embodiment, as arithmetic expressions used to compute Eθ(n), ten kinds of arithmetic expressions including the Eθ basic arithmetic expression (7) are prepared. Table 1 shows the ten kinds of arithmetic expressions and the conditions for the arithmetic expressions. Note that, at the time of computing Eθ(n), whether the conditions are satisfied is determined starting from the conditions on the top of Table 1. If it is determined that the conditions are satisfied, whether the subsequent conditions are satisfied is not determined. Then, Eθ(n) is computed according to the arithmetic expression corresponding to the conditions that are determined to be satisfied.

TABLE 1

| | CONDITIONS (AND) | ARITHMETIC |
|---|---|---|
| 1 | $S_1[n] \neq 0, S_2[n-1] \neq 0, S_2[n] \neq 0,$ $S_1[n-1] \neq 0, P_1 - P_2 \neq 0$ | Eθ BASIC ARITHMETIC EXPRESSION (EXPRESSION (7)) |
| 2 | $S_1[n] \neq 0, S_2[n-1] \neq 0, S_2[n] \neq 0,$ $S_1[n-1] \neq 0, P_1 - P_2 = 0$ | Eθ[n] ← IMMEDIATELY PRECEDING VALUE |
| 3 | $S_1[n] \neq 0, S_2[n-1] \neq 0, S_2[n] \neq 0,$ $S_1[n-1] = 0, S_2[n-1] > 0$ | $E\theta[n] = \sin^{-1}\left(\frac{\sqrt{3}}{2} \cdot \frac{S_2[n]}{S_2[n-1]}\right) - 120$ |
| 4 | $S_1[n] \neq 0, S_2[n-1] \neq 0, S_2[n] \neq 0,$ $S_1[n-1] = 0, S_2[n-1] < 0$ | $E\theta[n] = \sin^{-1}\left(-\frac{\sqrt{3}}{2} \cdot \frac{S_2[n]}{S_2[n-1]}\right) - 120$ |
| 5 | $S_1[n] \neq 0, S_2[n-1] \neq 0, S_2[n] = 0, S_1[n] > 0$ | Eθ[n] = 60 |
| 6 | $S_1[n] \neq 0, S_2[n-1] \neq 0, S_2[n] = 0, S_1[n] < 0$ | Eθ[n] = -120 |
| 7 | $S_1[n] \neq 0, S_2[n-1] = 0, S_1[n-1] > 0$ | $E\theta[n] = \sin^{-1}\left(\frac{\sqrt{3}}{2} \cdot \frac{S_1[n]}{S_1[n-1]}\right)$ |
| 8 | $S_1[n] \neq 0, S_2[n-1] = 0, S_1[n-1] < 0$ | $E\theta[n] = \sin^{-1}\left(-\frac{\sqrt{3}}{2} \cdot \frac{S_1[n]}{S_1[n-1]}\right)$ |
| 9 | $S_1[n] = 0, S_2[n] > 0$ | Eθ[n] = 0 |
| 10 | $S_1[n] = 0, S_2[n] < 0$ | Eθ[n] = 180 |

The first arithmetic expression from the top of Table 1 is the Eθ basic arithmetic expression (7). The Eθ basic arithmetic expression (7) is used when the condition that neither $S_1(n)$ nor $S_2(n)$ is zero and the condition that none of the denominators of the fractions included in the Eθ basic arithmetic expression (7) are zero are both satisfied. The condition that none of the denominators of the fractions included in the Eθ basic arithmetic expression (7) are zero is satisfied when $p_1-p_2 \neq 0$, $p_1^2+p_1p_2+p_2^2 \neq 0$, $S_1(n-1) \neq 0$, and $S_2(n-1) \neq 0$. Note that $S_1(n-1)$ is the denominator of $p_1$ and $S_2(n-1)$ is the denominator of $p_2$.

Note that, $p_1^2+p_1p_2+p_2^2=0$ is satisfied only when $p_1=p_2=0$. However, the phase of a sinusoidal signal output from the first magnetic sensor 71 is 120° different from the phase of a sinusoidal signal output from the second magnetic sensor 72, and hence the sensor values $S_1$, $S_2$ from both the magnetic sensors 71, 72 do not become zero at the same time. Therefore, $p_1^2+p_1p_2+p_2^2=0$ is not satisfied. Therefore, the condition that none of the denominators of the fractions included in the Eθ basic arithmetic expression (7) are zero is satisfied when all the conditions that $p_1-p_2 \neq 0$, $S_1(n-1) \neq 0$, and $S_2(n-1) \neq 0$ are satisfied.

The second arithmetic expression from the top of Table 1 is an arithmetic expression that is used when $p_1-p_2=0$. The case where $p_1-p_2=0$ is satisfied will be considered blow. In this case, because $p_1=p_2$, the following expression (13) is satisfied.

$$\frac{A_1 \sin E\theta[n]}{A_1 \sin E\theta[n-1]} = \frac{A_2 \sin(E\theta[n] + 120)}{A_2 \sin(E\theta[n-1] + 120)} \quad (13)$$

When this expression is deformed, the following expression (14) can be obtained.

$$\frac{\sin E\theta[n-1]}{\sin E\theta[n]} \cdot \frac{\sin(E\theta[n] + 120)}{\sin(E\theta[n-1] + 120)} = 1 \quad (14)$$

The case where the expression (14) is satisfied is the case where Eθ(n) is equal to Eθ(n-1), that is, the case where the present value Eθ(n) is equal to the immediately preceding value Eθ(n-1). When the condition that neither $S_1(n)$ nor $S_2(n)$ is zero, the condition that neither the denominator $S_1(n-1)$ of $p_1$ nor the denominator $S_2(n-1)$ of $p_2$ is zero, and the condition that $p_1-p_2=0$ are all satisfied, the immediately preceding computed $E\theta(n-1)$ is used as the present $E\theta(n)$.

The third and fourth arithmetic expressions from the top of Table 1 are arithmetic expressions that are used when the denominator $S_1(n-1)$ of $p_1$ is zero. Because $S_1(n-1)=A_1 \sin E\theta(n-1)$, $S_1(n-1)=0$ is satisfied when $\sin E\theta(n-1)=0$. That is, when $E\theta(n-1)$ is 0° or 180°, $S_1(n-1)$ is zero. Because $S_2(n-1)=A_2 \sin(E\theta(n-1)+120)$, $S_2(n-1)>0$ is satisfied when $E\theta(n-1)$ is 0°, and $S_2(n-1)<0$ is satisfied when $E\theta(n-1)$ is 180°. $E\theta(n-1)=0$ is satisfied when $S_1(n-1)=0$ and $S_2(n-1)>0$, and $E\theta(n-1)=180$ is satisfied when $S_1(n-1)=0$ and $S_2(n-1)<0$.

When $E\theta(n-1)=0$, the expressions (6c), (6d) are expressed by the following expressions (15c), (15d), respectively.

$$S_2(n)=A_2 \sin(E\theta(n)+120) \tag{15c}$$

$$S_2(n-1)=A_2 \sin 120=\sqrt{3}/2 \cdot A_2 \tag{15d}$$

The following expression (16) is obtained from the expression (15d).

$$A_2=(2/\sqrt{3})\cdot S_2(n-1) \tag{16}$$

When the expression (16) is substituted into the expression (15c), the following expression (17) is obtained.

$$\sin(E\theta(n)+120)=(\sqrt{3}/2)\cdot(S_2(n)/S_2(n-1)) \tag{17}$$

$E\theta(n)$ can be computed according to the following expression (18).

$$E\theta[n] = \sin^{-1}\left(\frac{\sqrt{3}}{2} \cdot \frac{S_2[n]}{S_2[n-1]}\right) - 120 \tag{18}$$

As shown in the third row from the top of Table 1, when the conditions that neither $S_1(n)$ nor $S_2(n)$ is zero, the denominator $S_2(n-1)$ of $p_2$ is not zero, the denominator $S_1(n-1)$ of $p_1$ is zero, and $S_2(n-1)>0$ are all satisfied, $E\theta(n)$ is computed according to the arithmetic expression expressed by the expression (18). On the other hand, when $E\theta(n-1)=180$, the expressions (6c), (6d) are expressed by the following expressions (19c), (19d), respectively.

$$S_2(n)=A_2 \sin(E\theta(n)+120) \tag{19c}$$

$$S_2(n-1)=A_2 \sin 300=-\sqrt{3}/2 \cdot A_2 \tag{19d}$$

The following expression (20) is obtained from the expression (19d).

$$A_2=(-2/\sqrt{3})\cdot S_2(n-1) \tag{20}$$

When the expression (20) is substituted into the expression (19c), the following expression (21) is obtained.

$$\sin(E\theta(n)+120)=(-\sqrt{3}/2)\cdot(S_2(n)/S_2(n-1)) \tag{21}$$

$E\theta(n)$ can be computed according to the following expression (22).

$$E\theta[n] = \sin^{-1}\left(-\frac{\sqrt{3}}{2} \cdot \frac{S_2[n]}{S_2[n-1]}\right) - 120 \tag{22}$$

As shown in the fourth row from the top of Table 1, when the conditions that neither $S_1(n)$ nor $S_2(n)$ is zero, the denominator $S_2(n-1)$ of $p_2$ is not zero, the denominator $S_1(n-1)$ of $p_1$ is zero, and $S_2(n-1)<0$ are all satisfied, $E\theta(n)$ is computed according to the arithmetic expression expressed by the expression (22). The fifth and sixth arithmetic expressions from the top of Table 1 are arithmetic expressions used when $S_2(n)=0$ is satisfied. Because $S_2(n)=A_2 \sin(E\theta(n)+120)$, when $\sin(E\theta(n)+120)=0$, $S_2(n)=0$ is satisfied. That is, when $E\theta(n)$ is −120° or 60°, $S_2(n)=0$ is satisfied. Because $S_1(n)=A_1 \sin E\theta(n)$, $S_1(n)<0$ is satisfied when $E\theta(n)$ is −120°, and $S_1(n)>0$ is satisfied when $E\theta(n)=60°$. $E\theta(n)=60$ is satisfied when $S_2(n)=0$ and $S_1(n)>0$, and $E\theta(n)=-120$ is satisfied when $S_2(n)=0$ and $S_1(n)<0$.

As shown in the fifth row from the top of Table 1, when the conditions that $S_1(n)$ is not zero, the denominator $S_2(n-1)$ of $p_2$ is not zero, $S_2(n)=0$, and $S_1(n)>0$ are all satisfied, $E\theta(n)$ is computed as 60°. As shown in the sixth row from the top of Table 1, when the conditions that $S_1(n)$ is not zero, the denominator $S_2(n-1)$ of $p_2$ is not zero, $S_2(n)=0$, and $S_1(n)<0$ are all satisfied, $E\theta(n)$ is computed as −120°.

The seventh and eighth arithmetic expressions from the top of Table 1 are arithmetic expressions used when the denominator $S_2(n-1)$ of $p_2$ is zero. Because $S_2(n-1)=A_2 \sin(E\theta(n-1)+120)$, when $\sin(E\theta(n-1)+120)=0$, $S_2(n-1)=0$ is satisfied. That is, when $E\theta(n-1)$ is −120° or 60°, $S_2(n-1)$ is zero. Because $S_1(n-1)=A_1 \sin E\theta(n-1)$, $S_1(n-1)<0$ is satisfied when $E\theta(n-1)$ is −120°, and $S_1(n-1)>0$ is satisfied when $E\theta(n-1)$ is 60°. Therefore, $E\theta(n-1)=60$ is satisfied when $S_2(n-1)=0$ and $S_1(n-1)>0$, and $E\theta(n-1)=-120$ is satisfied when $S_2(n-1)=0$ and $S_1(n-1)<0$.

When $E\theta(n-1)=60$, the expressions (6a), (6b) are expressed by the following expressions (23a), (23b), respectively.

$$S_1(n)=A_1 \sin E\theta(n) \tag{23a}$$

$$S_1(n-1)=A_1 \sin 60=\sqrt{3}/2 \cdot A_1 \tag{23b}$$

The following expression (24) is obtained from the expression (23b).

$$A_1=(2/\sqrt{3})\cdot S_1(n-1) \tag{24}$$

When the expression (24) is substituted into the expression (23a), the following expression (25) is obtained.

$$\sin E\theta(n)=(\sqrt{3}/2)\cdot(S_1(n)/S_1(n-1)) \tag{25}$$

$E\theta(n)$ can be computed according to the following expression (26).

$$E\theta[n] = \sin^{-1}\left(\frac{\sqrt{3}}{2} \cdot \frac{S_1[n]}{S_1[n-1]}\right) \tag{26}$$

As shown in the seventh row from the top of Table 1, when the conditions that $S_1(n)$ is not zero, the denominator $S_2(n-1)$ of $p_2$ is zero, and $S_1(n-1)>0$ are all satisfied, $E\theta(n)$ is computed according to the arithmetic expression expressed by the expression (26). On the other hand, when $E\theta(n-1)=-120$, the expressions (6a), (6b) are expressed by the following expressions (27a), (27b), respectively.

$$S_1(n)=A_1 \sin E\theta(n) \tag{27a}$$

$$S_1(n-1)=A_1 \sin(-120)=-\sqrt{3}/2 \cdot A_2 \tag{27b}$$

The following expression (28) is obtained from the following expression (27b).

$$A_1=(-2/\sqrt{3})\cdot S_1(n-1) \tag{28}$$

When the expression (28) is substituted into the expression (27a), the following expression (29) is obtained.

$$\sin E\theta(n)=(-\sqrt{3}/2)\cdot(S_1(n)/S_1(n-1)) \tag{29}$$

Eθ(n) can be computed according to the following expression (30).

$$E\theta[n] = \sin^{-1}\left(-\frac{\sqrt{3}}{2} \cdot \frac{S_1[n]}{S_1[n-1]}\right) \quad (30)$$

As shown by the eighth row from the top of Table 1, when the conditions that $S_1(n)$ is not zero, the denominator $S_2(n-1)$ of $p_2$ is zero, and $S_1(n-1)<0$ are all satisfied, Eθ(n) is computed according to an arithmetic expression expressed by the expression (30). The ninth and tenth arithmetic expressions from the top of Table 1 are arithmetic expressions that are used when $S_1(n)=0$ is satisfied. Because $S_1(n)=A_1 \sin E\theta(n)$, when $\sin E\theta(n)=0$, $S_1(n)=0$ is satisfied. That is, when Eθ(n) is 0° or 180°, $S_1(n)=0$ is satisfied. Because $S_2(n)=A_2 \sin(E\theta(n)+120)$, $S_2(n)>0$ is satisfied when Eθ(n) is 0°, and $S_2(n)<0$ is satisfied when Eθ(n) is 180°. Therefore, Eθ(n)=0 is satisfied when $S_1(n)=0$ and $S_2(n)>0$, and Eθ(n)=180 is satisfied when $S_1(n)=0$ and $S_2(n)<0$.

As shown in the ninth row from the top of Table 1, when the conditions that $S_1(n)$ is zero and $S_2(n)>0$ are both satisfied, Eθ(n) is computed as 0°. Further, as shown in the tenth row from the top of Table 1, when the conditions that $S_1(n)$ is zero and $S_2(n)<0$ are both satisfied, Eθ(n) is computed as 180°. When Eθ(n) is computed, it is possible to compute the amplitude $A_1$ according to the expression (6a), and compute the amplitude $A_2$ according to the expression (6d). That is, it is possible to compute E, θ(n), $A_1$, $A_2$ in the first computation mode.

The second computation mode is a computation mode that is applied when both the second and third magnetic sensors 72, 73 sense one and the same magnetic pole for three consecutive sampling periods (three consecutive computation periods). In the second computation mode, the rotation angle θ is computed on the basis of the output signals from the second and third magnetic sensors 72, 73, which are sampled at three sampling timings.

When the output signals $S_2$, $S_3$ from the second magnetic sensor 72 and the third magnetic sensor 73 are expressed with the use of an angular width error correction value E, the output signal $S_2(n)$ from the second magnetic sensor 72 is expressed by $S_2(n)=A_2 \cdot \sin(E_2\theta(n)+120)$, and the output signal $S_3(n)$ from the third magnetic sensor 73 is expressed by $S_3(n)=A_3 \cdot \sin(E_3\theta(n)+240)$. Note that, $E_3$ is an angular width error correction value corresponding to a magnetic pole sensed by the third magnetic sensor 73. When the second magnetic sensor 72 and the third magnetic sensor 73 sense one and the same magnetic pole, $E_2$ is equal to $E_3$. Therefore, when $E_2$ and $E_3$ are denoted by E, the output signal $S_2(n)$ from the second magnetic sensor 72 is expressed by $S_2(n)=A_2 \cdot \sin(E\theta(n)+120)$, and the output signal $S_3(n)$ from the third magnetic sensor 73 is expressed by $S_3(n)=A_3 \cdot \sin(E\theta(n)+240)$.

When (Eθ(n)+120) is substituted by EΘ(n), the second output signal $S_2(n)$ is expressed by $S_2(n)=A_2 \sin E\Theta(n)$, and the third output signal $S_3(n)$ is expressed by $S_3(n)=A_3 \cdot \sin (E\Theta(n)+120)$. EΘ(n) and E can be computed with the use of the second output signal $S_2$ and the third output signal $S_3$ according to a method similar to the above-described method. Because EΘ(n)=Eθ(n)+120, θ(n)=(EΘ(n)−120)/E is satisfied. Therefore, the rotation angle θ(n) of the input shaft 8 can be computed by substituting the computed EΘ(n) and E into the expression θ(n)=(EΘ(n)−120)/E. When EΘ(n) is computed, the amplitude $A_2$ and the amplitude $A_3$ can be computed. That is, in the second computation mode, E, θ(n), $A_2$, $A_3$ can be computed.

When the second and third output signals $S_2$, $S_3$, which are sampled at three sampling timings and which are used to compute the rotation angle in the second computation mode, are expressed by the following expressions (31a) to (31f) after the model of the expressions (6a) to (6f), an EΘ basic arithmetic expression and an E arithmetic expression can be expressed by the following expressions (32), (33), respectively.

$$S_2(n) = A_2 \sin(E\theta(n) + 120) \quad (31a)$$

$$S_2(n-1) = A_2 \sin(E\theta(n-1) + 120) \quad (31b)$$

$$S_2(n-2) = A_2 \sin(E\theta(n-2) + 120) \quad (31c)$$

$$S_3(n) = A_3 \sin(E\theta(n) + 120) \quad (31d)$$

$$S_3(n-1) = A_3 \sin(E\theta(n-1) + 120) \quad (31e)$$

$$S_3(n-2) = A_3 \sin(E\theta(n-2) + 120) \quad (31f)$$

$$E\theta[n] = \frac{1}{4}\cos^{-1}\left(1 - \frac{(3p_1'^2 p_2'^2 - 2p_1'^2 - 2p_2'^2 + p_1' p_2')^2}{2(p_1' - p_2')^2(p_1'^2 + p_1' p_2' + p_2'^2)}\right) - \frac{1}{4}\cos^{-1}\left(\frac{1}{2} - \frac{3}{2} \cdot \frac{p_1' p_2' + p_2'^2}{p_1'^2 + p_1' p_2' + p_2'^2}\right) \quad (32)$$

where $$p_1' = \frac{S_2[n]}{S_2[n-1]}$$

$$p_2' = \frac{S_3[n]}{S_3[n-1]}$$

$$E = \frac{1}{240} \cdot \cos^{-1}\left(\frac{q_1'^2 t'^2 - 2q_1' q_2' t' + q_2'^2}{2t'(S_2[n]S_3[n] - S_2[n-1]S_3[n-1])^2} - 1\right) \quad (33)$$

where $q_1' = S_2[n-1]^2 - S_2[n]^2$ $q_2' = S_3[n]^2 - S_3[n-1]^2$ $$t' = \frac{S_2[n]S_3[n]q_3' + S_2[n-1]S_3[n-1]q_4' + S_2[n-2]S_3[n-2]q_1'}{S_2[n]S_3[n]q_5' + S_2[n-1]S_3[n-1]q_6' + S_2[n-2]S_3[n-2]q_2'}$$

$q_3' = S_2[n-2]^2 - S_2[n-1]^2$ $q_4' = S_2[n]^2 - S_2[n-2]^2$ $q_5' = S_3[n-1]^2 - S_3[n-2]^2$ $q_6' = S_3[n-2]^2 - S_3[n]^2$

In the first computation mode and the second computation mode, because the rotation angle θ(n) of the input shaft 8 is computed on the basis of the output signals from two magnetic sensors among the three magnetic sensors 71, 72, 73, which are sampled at three sampling timings, the highly accurate rotation angle can be computed. In the first computation mode and the second computation mode, even if the number of expressions used to compute the rotation angle θ(n) of the input shaft 8 is smaller than the number of unknown quantities originally included in these expressions, the rotation angle θ(n) of the input shaft 8 can be computed, and hence the number of sensor values required to compute the rotation angle θ(n) of the input shaft 8 can be reduced.

In the first computation mode and the second computation mode, the amplitudes of the output signals from the same magnetic sensor, which are sampled at the three sampling timings, are assumed to be equal to each other. The amplitudes of the output signals from the same magnetic sensor, which are sampled at three sampling timings, may be different values due to the influence of temperature changes. However, if the sampling interval is short, a temperature change between the three sampling timings is considerably small. Therefore, the amplitudes of the output signals from the same magnetic sensor, which are sampled at the three sampling timings, may be assumed to be equal to each other. Therefore, in the first computation mode and the second computation mode, variations of amplitudes due the influence of temperature changes between the three sampling timings can be compensated for. In the first computation mode and the second computation mode, because the amplitudes of the output signals from the two magnetic sensors used to compute the rotation angle are regarded as different unknown quantities, the influence of variations of temperature characteristics between the two magnetic sensors can be compensated for. As a result, the highly accurate rotation angle can be detected.

In each of the first computation mode and the second computation mode, it is possible to highly accurately compensate for variations of the angular widths (pitch widths) of the magnetic poles M1 to M8 of the magnet 61. Therefore, it is possible to detect a rotation angle with a smaller error. The third computation mode is a computation mode that is applied in the case where neither the first computation mode nor the second computation mode can be applied and the angular width error correction value $E_1$ corresponding to a magnetic pole sensed by the first magnetic sensor 71 and the amplitude $A_1$ of the first output signal $S_1$ have already been computed in the first computation mode and stored in the memory. In the third computation mode, the rotation angle θ is computed mainly based on the output signal $S_1$ from the first magnetic sensor 71.

Figure 8A:
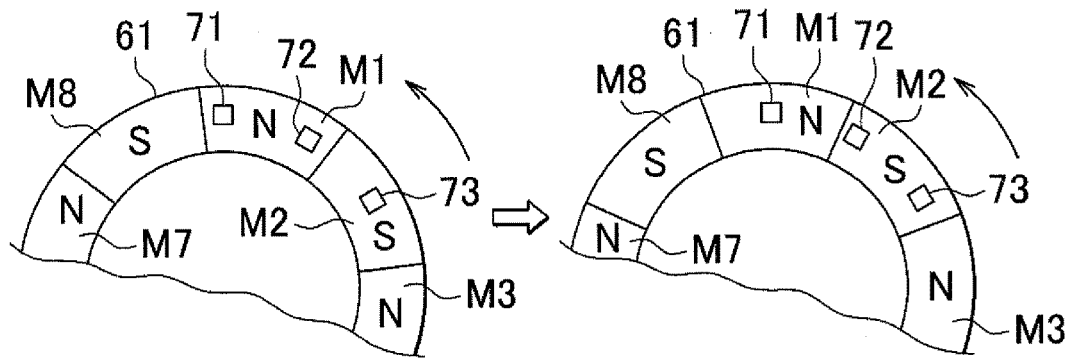
FIG. 8A is a schematic view illustrating the case where a third computation mode is applied.

The third computation mode is applied when the magnetic pole sensed by the second magnetic sensor 72 is changed from the one in the state where the same magnetic pole (M1 in this example) is sensed by the first and second magnetic sensors 71, 72, in the case where the magnet 61 (the input shaft 8) is rotating in the direction indicated by an arrow, for example, as illustrated in FIG. 8A.

When the angular width error correction value E and the number n of the present computation period are used, the output signal $S_1$ from the first magnetic sensor 71, which is sampled in the present computation period, is expressed by the following expression (34).

$$S_1(n)=A_1(n)\sin(E_1\theta(n)) \quad (34)$$

$E_1$ is the angular width error correction value corresponding to the magnetic pole sensed by the first magnetic sensor 71. The rotation angle θ(n) is expressed by the following expression (35) based on the expression (34).

$$\theta(n)=(1/E_1)\sin^{-1}(S_1(n)/A_1) \quad (35)$$

Figure 9:
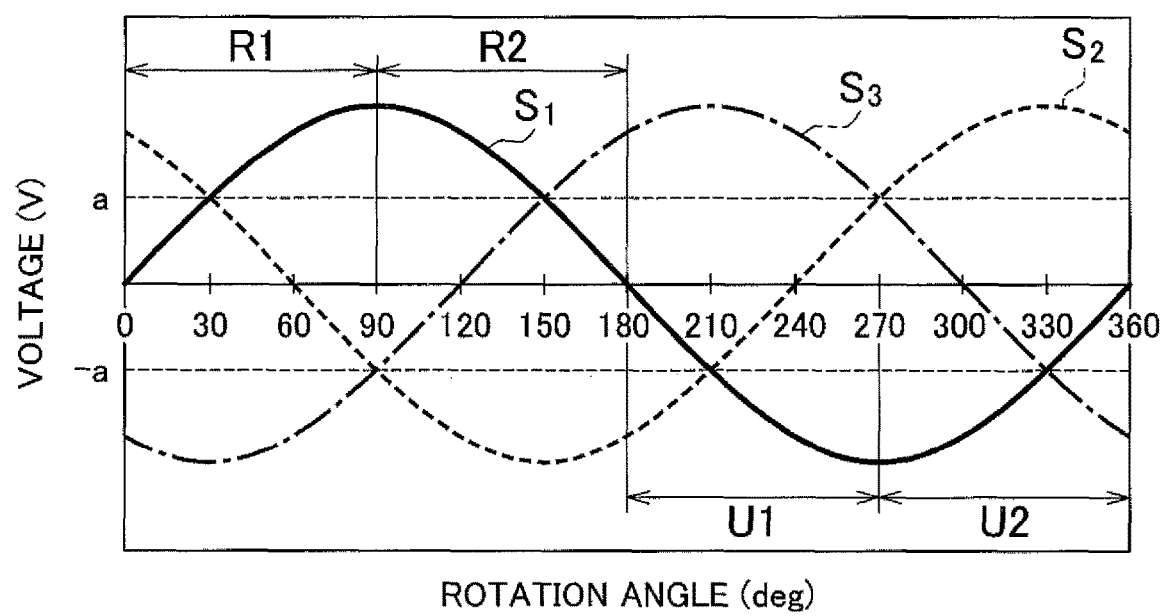
FIG. 9 is a graph illustrating the third computation mode.

When $E_1$ and $A_1$ that are stored in the memory and that correspond to the magnetic pole sensed by the first magnetic sensor 71 are substituted into the expression (35), the rotation angle θ(n) is computed. However, when the rotation angle θ(n) is computed according to the expression (35), two rotation angles θ(n) are computed and therefore it is necessary to determine which of the two rotation angles θ(n) is the actual rotation angle. This determination method will be described with reference to FIG. 9. FIG. 9 shows waveforms of the first output signal $S_1$, the second output signal $S_2$, and the third output signal $S_3$ in one period. A rotation angle (deg) on the abscissa axis in FIG. 9 represents an electrical angle.

As shown in FIG. 9, when the first output signal $S_1(n)$ takes, for example, a positive value, the rotation angles θ(n) corresponding to $(1/E_1)\sin^{-1}(S_1(n)/A_1)$ are two rotation angles, that is, a rotation angle in a region R1 from 0° to 90° and a rotation angle in a region R2 from 90° to 180°. On the other hand, when the first output signal $S_1(n)$ takes, for example, a negative value, the rotation angles θ(n) corresponding to $(1/E_1)\sin^{-1}(S_1(n)/A_1)$ are two rotation angles, that is, a rotation angle in a region U1 from 180° to 270° and a rotation angle in a region U2 from 270° to 360°.

In the present embodiment, it is determined which of the two rotation angles computed according to the expression (35) is the actual rotation angle, on the basis of one of the output signals $S_2$, $S_3$ from the two magnetic sensors 72, 73, which are the magnetic sensors other than the first magnetic sensor 71. For example, the case where the determination is made on the basis of the second output signal $S_2(n)$ will be described. ½ of the amplitude $A_2$ of the second output signal $S_2$ is set as a threshold a (a>0). The threshold a can be obtained on the basis of, for example, the amplitude $A_2$ of the second output signal $S_2$ that is stored in the memory and that corresponds to the magnetic pole sensed by the first magnetic sensor 71. Note that, ½ of the amplitude $A_1$ of the first output signal $S_1$ may be set as the threshold a (a>0).

The values that the rotation angle θ(n) of the input shaft 8 may take when the second output signal $S_2(n)$ is equal to or greater than the threshold a are within the range of 0° to 30° and the range of 270° to 360°. The values that the rotation angle θ(n) of the input shaft 8 may take when the second output signal $S_2(n)$ is smaller than the threshold −a are within the range of 90° to 210°. The values that the rotation angle θ(n) of the input shaft 8 may take when the second output signal $S_2(n)$ is equal to or greater than the threshold −a and smaller than the threshold a are within the range of 30° to 90° and the range of 210° to 270°.

Therefore, it is possible to determine which of the two rotation angles computed according to the expression (35) is the actual rotation angle on the basis of the second output signal $S_2(n)$. Specifically, in the case where the first output signal $S_1(n)$ takes a positive value, if the second output signal $S_2(n)$ is equal to or greater than the threshold −a, it is determined that the rotation angle in the region R1 among the two rotation angles computed according to the expression (35) is the actual rotation angle. On the other hand, if the second output signal $S_2(n)$ is smaller than the threshold −a, it is determined that the rotation angle in the region R2 among the two rotation angles computed according to the expression (35) is the actual rotation angle.

In the case where the first output signal $S_1(n)$ takes a negative value, if the second output signal $S_2(n)$ is smaller than the threshold a, it is determined that the rotation angle in the region U1 among the two rotation angles computed according to the expression (35) is the actual rotation angle. On the other hand, if the second output signal $S_2(n)$ is equal to or greater than the threshold a, it is determined that the rotation angle in the region U2 among the two rotation angles computed according to the expression (35) is the actual rotation angle.

The fourth computation mode is a computation mode that is applied in the case where neither the first computation mode nor the second computation mode can be applied and the angular width error correction value $E_2$ corresponding to a magnetic pole sensed by the second magnetic sensor 72 and the amplitude $A_2$ of the second output signal $S_2$ have already been computed in the first computation mode or the third computation mode and stored in the memory. In the fourth computation mode, the rotation angle θ is computed mainly based on the output signal $S_2$ from the second magnetic sensor 72.

Figure 8B:
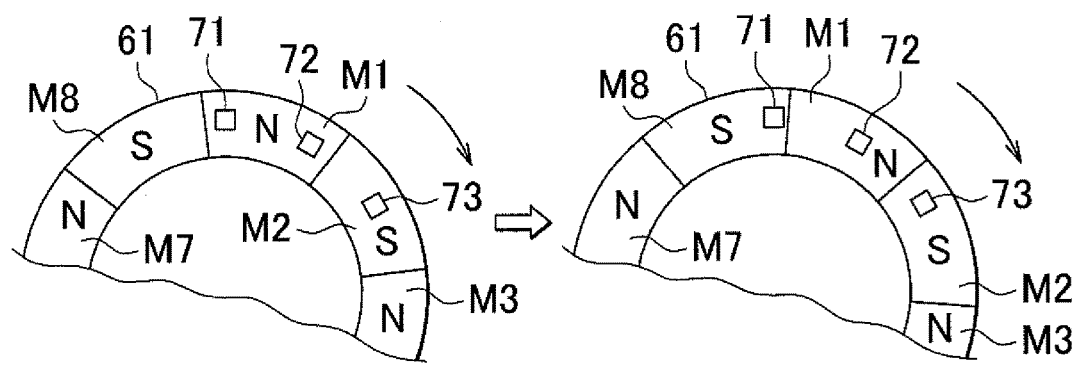
FIG. 8B is a schematic view illustrating the case where a fourth computation mode is applied.

The fourth computation mode is applied when the magnetic pole sensed by the first magnetic sensor 71 is changed from the one in the state where the same magnetic pole (M1 in this example) is sensed by the first and second magnetic sensors 71, 72, in the case where the magnet 61 (the input shaft 8) is rotating in the direction indicated by an arrow, for example, as illustrated in FIG. 8B.

When the angular width error correction value E and the number n of the present computation period are used, the output signal $S_2$ from the second magnetic sensor 72, which is sampled in the present computation period, is expressed by the following expression (36).

$$S_2(n)=A_2(n)\sin(E_2\theta(n)+120) \quad (36)$$

$E_2$ is the angular width error correction value corresponding to the magnetic pole sensed by the second magnetic sensor 72. The rotation angle θ(n) is expressed by the following expression (37) based on the expression (36).

$$\theta(n)=(1/E_2)\{\sin^{-1}(S_2(n)/A_2)-120\} \quad (37)$$

When $E_2$ and $A_2$ that are stored in the memory and that correspond to the magnetic pole sensed by the second magnetic sensor 72 are substituted into the expression (37), the rotation angle θ(n) is computed.

When the rotation angle θ(n) is computed according to the expression (37), two rotation angles θ(n) are computed. Then, it is determined which of the two rotation angles computed according to the expression (37) is the actual rotation angle, on the basis of one of the output signals $S_1$, $S_3$ from the two magnetic sensors 71, 73, which are the magnetic sensors other than the second magnetic sensor 72. For example, the case where the determination is made on the basis of the first output signal $S_1(n)$ will be described. ½ of the amplitude $A_1$ of the first output signal $S_1$ or ½ of the amplitude $A_2$ of the second output signal $S_2$ stored in the memory is set as a threshold a (a>0).

In the case where the second output signal $S_2(n)$ takes a positive value, if the first output signal $S_1(n)$ is smaller than the threshold −a, it is determined that the rotation angle within the range of 240° to 330° among the two rotation angles computed according to the expression (37) is the actual rotation angle. On the other hand, if the first output signal $S_1(n)$ is equal to or greater than the threshold −a, it is determined that the rotation angle within the range of 0° to 60° or the range of 330° to 360° among the two rotation angles computed according to the expression (37) is the actual rotation angle.

In the case where the second output signal $S_2(n)$ takes a negative value, if the first output signal $S_1(n)$ is equal to or greater than the threshold a, it is determined that the rotation angle within the range of 60° to 150° among the two rotation angles computed according to the expression (37) is the actual rotation angle. On the other hand, if the first output signal $S_1(n)$ is smaller than the threshold a, it is determined that the rotation angle within the range of 150° to 240° among the two rotation angles computed according to the expression (37) is the actual rotation angle.

Figure 8C:
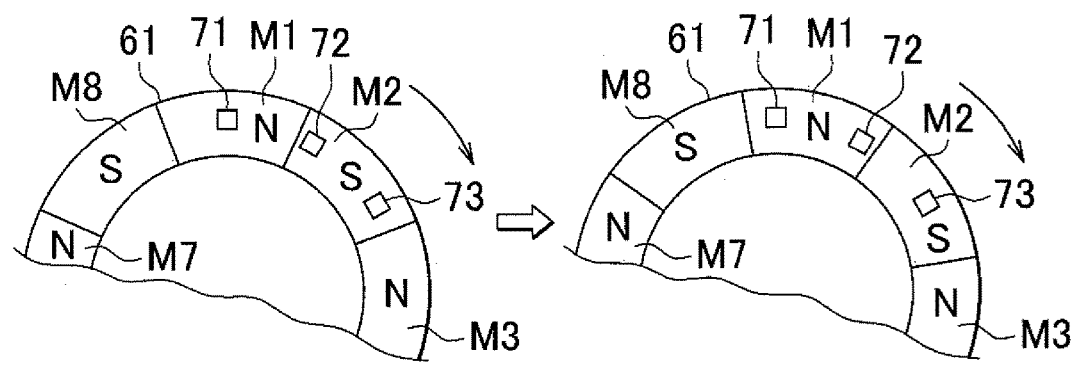
FIG. 8C is a schematic view illustrating the case where a fifth computation mode is applied.

The fifth computation mode is a computation mode that is applied in the case where neither the first computation mode nor the second computation mode can be applied and the angular width error correction value $E_3$ corresponding to a magnetic pole sensed by the third magnetic sensor 73 and the amplitude $A_3$ of the third output signal $S_3$ have already been computed in the second computation mode and stored in the memory. In the fifth computation mode, the rotation angle θ is computed mainly based on the output signal $S_3$ from the third magnetic sensor 73. The fifth computation mode is applied when the magnetic pole sensed by the second magnetic sensor 72 is changed from the one in the state where the same magnetic pole (M2 in this example) is sensed by the second and third magnetic sensors 72, 73, in the case where the magnet 61 (the input shaft 8) is rotating in the direction indicated by an arrow, for example, as illustrated in FIG. 8C.

When the angular width error correction value E and the number n of the present computation period are used, the output signal $S_3$ from the third magnetic sensor 73, which is sampled in the present computation period, is expressed by the following expression (38).

$$S_3(n)=A_3(n)\sin(E_3\theta(n)+240) \quad (38)$$

$E_3$ is the angular width error correction value corresponding to the magnetic pole sensed by the third magnetic sensor 73. The rotation angle θ(n) is expressed by the following expression (39) based on the expression (38).

$$\theta(n)=(1/E_3)\{\sin^{-1}(S_3(n)/A_3)-240\} \quad (39)$$

When $E_3$ and $A_3$ that are stored in the memory and that correspond to the magnetic pole sensed by the third magnetic sensor 73 are substituted into the expression (39), the rotation angle θ(n) is computed.

When the rotation angle θ(n) is computed according to the expression (39), two rotation angles θ(n) are computed. Then, it is determined which of the two rotation angles computed according to the expression (39) is the actual rotation angle, on the basis of one of the output signals $S_1$, $S_2$ from the two magnetic sensors 71, 72, which are the magnetic sensors other than the third magnetic sensor 73. For example, the case where the determination is made on the basis of the second output signal $S_2(n)$ will be described. ½ of the amplitude $A_2$ of the second output signal $S_2$ or ½ of the amplitude $A_3$ of the third output signal $S_3$ stored in the memory is set as a threshold a (a>0).

In the case where the third output signal $S_3(n)$ takes a positive value, if the second output signal $S_2(n)$ is smaller than the threshold −a, it is determined that the rotation angle within the range of 120° to 210° among the two rotation angles computed according to the expression (39) is the actual rotation angle. On the other hand, if the second output signal $S_2(n)$ is equal to or greater than the threshold −a, it is determined that the rotation angle within the range of 210° to 300° among the two rotation angles computed according to the expression (39) is the actual rotation angle.

In the case where the third output signal $S_3(n)$ takes a negative value, if the second output signal $S_2(n)$ is equal to or greater than the threshold a, it is determined that the rotation angle within the range of 300° to 360° or the range of 0° to 30° among the two rotation angles computed according to the expression (39) is the actual rotation angle. On the other hand, if the second output signal $S_2(n)$ is smaller than the threshold a, it is determined that the rotation angle within the range of 30° to 120° among the two rotation angles computed according to the expression (39) is the actual rotation angle.

Figure 10:
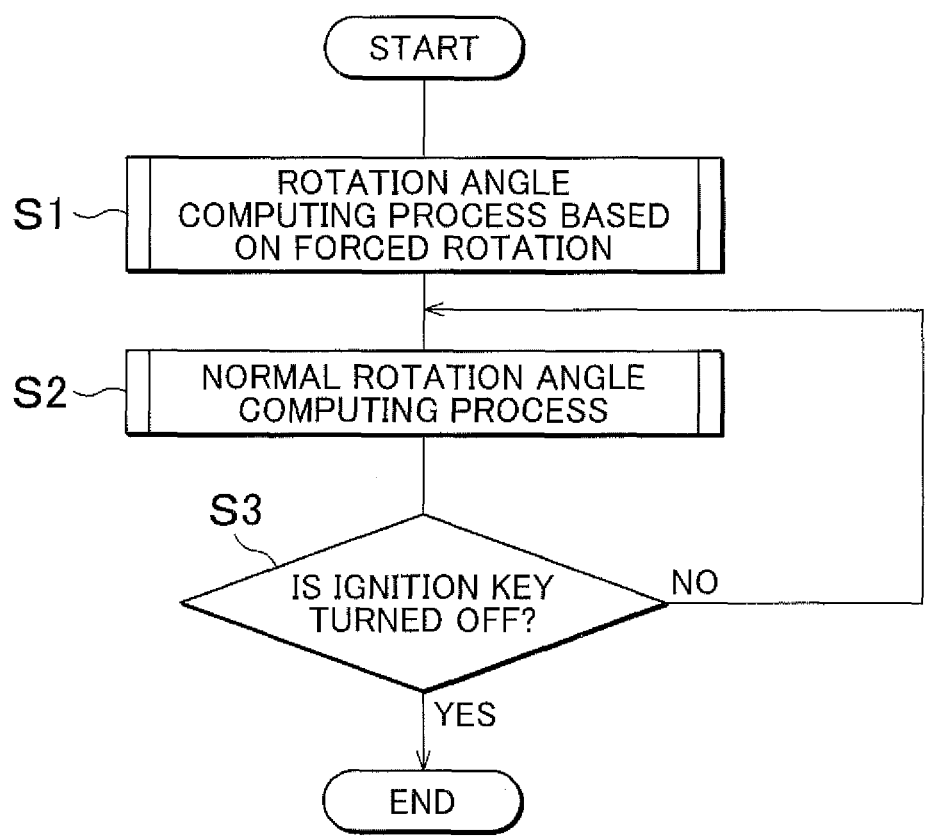
FIG. 10 is a flowchart showing the operation of a first rotation angle computation unit.

FIG. 10 is a flowchart showing the operation of the rotation angle computation unit. When a power supply for the torque computation ECU 77 is turned on, the rotation angle computation unit executes a rotation angle computing process based on forced rotation (step S1). In this process, the electric motor 18 is forced to rotate temporarily to rotate the input shaft 8 (the output shaft 9), and the rotation angle θ of the input shaft 8 is computed. Details of the process will be described later.

In the first computation mode and the second computation mode, if there is no change in the output signals from the two magnetic sensors used to compute the rotation angle θ(n) between the immediately preceding sampling timing and the present sampling timing, the immediately preceding computed values of Eθ(n) (or EΘ(n)), E, and θ(n) are used as the present values of Eθ(n) (or EΘ(n)), E, and θ(n) (see the second arithmetic expression from the top of Table 1). However, at the time when the power supply for the torque computation ECU 77 is turned on by turning on the ignition key, there are no immediately preceding computed values of Eθ(n) (or EΘ(n)), E, and θ(n). Therefore, if the output signals from the two magnetic sensors used to compute the rotation angle θ(n) do not change after the power supply of the torque computation ECU 77 is turned on, the rotation angle θ(n) cannot be computed. Therefore, in order to create the immediately preceding values of Eθ(n) (or EΘ(n)), E, and θ(n), the rotation angle computing process based on forced rotation is executed.

When the rotation angle computing process based on forced rotation ends, the rotation angle computation unit executes a normal rotation angle computing process (step S2). Details of the process will be described later. The normal rotation angle computing process is continuously executed until the ignition key is turned off. When the ignition key is turned off (YES in step S3), the rotation angle computation unit ends the normal rotation angle computing process.

Figure 11A:
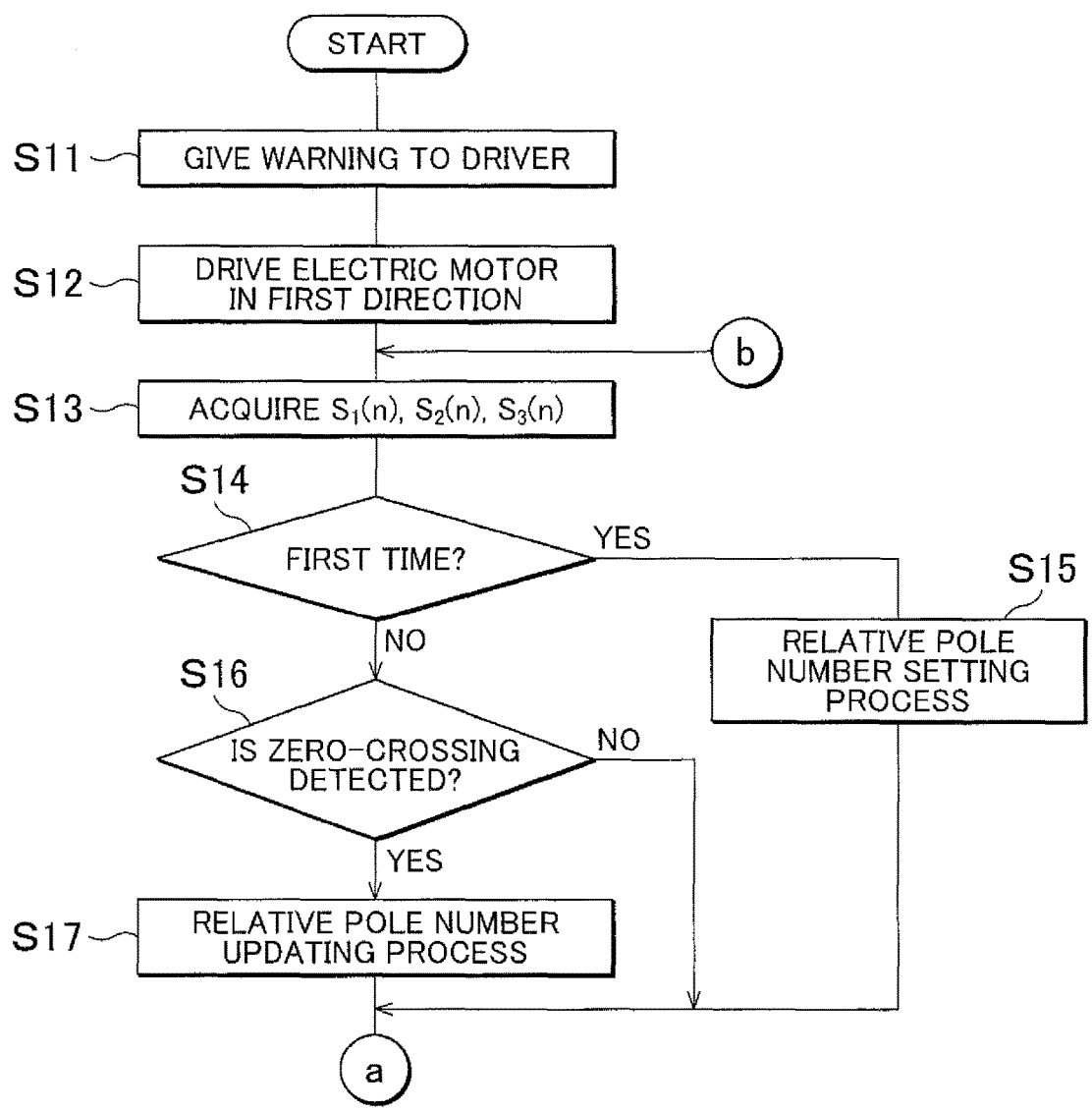
FIG. 11A is a flowchart showing part of the procedure of a rotation angle computing process based on forced rotation in step S1 in FIG. 10.
Figure 11C:
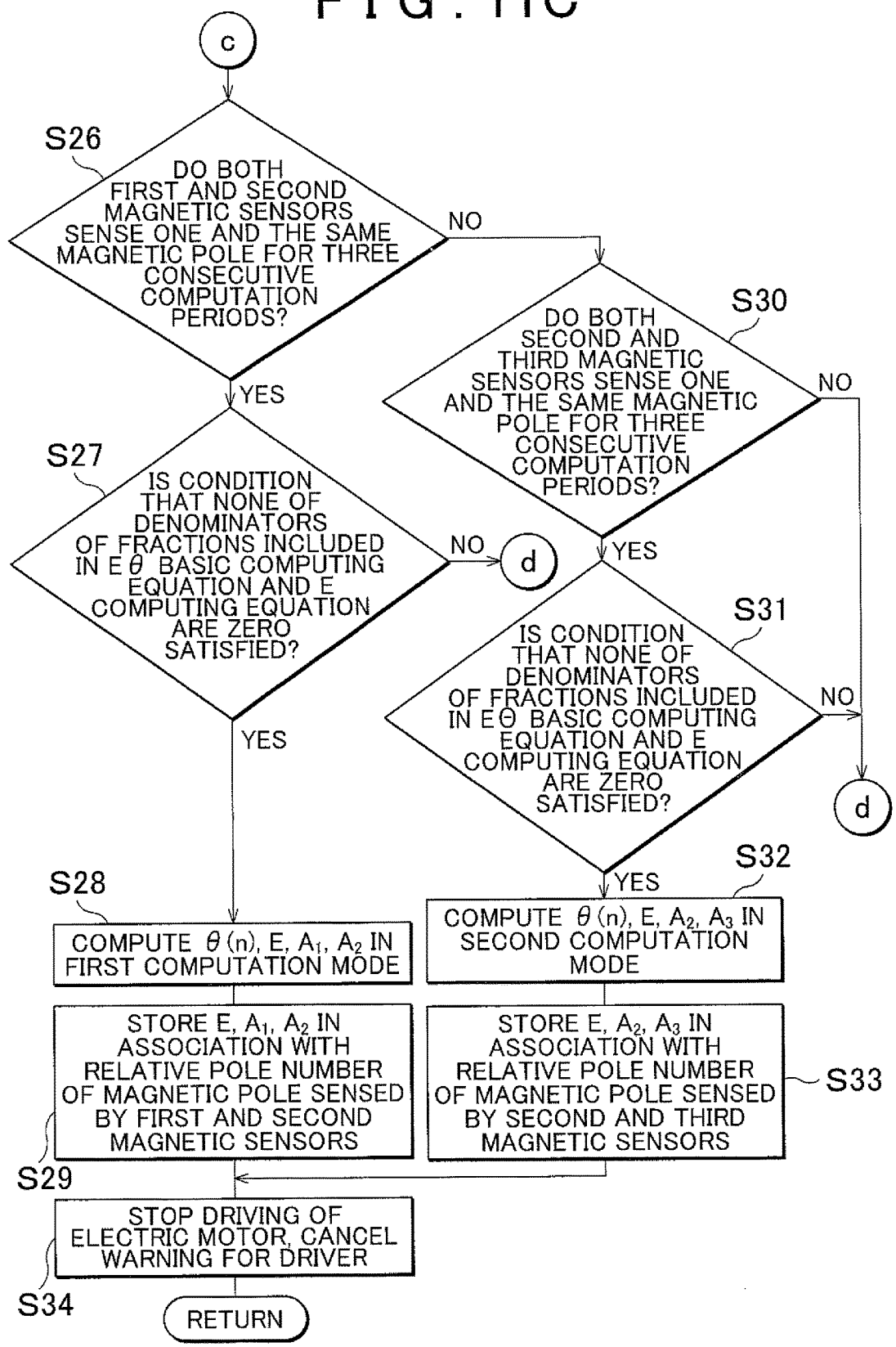
FIG. 11C is a flowchart showing part of the procedure of the rotation angle computing process based on forced rotation in step S1 in FIG. 10.

FIG. 11A, FIG. 11B, and FIG. 11C are flowcharts showing the procedure of the rotation angle computing process based on forced rotation in step S1 in FIG. 10. The numbers assigned to the magnetic poles, as relative numbers, using the magnetic pole sensed by the first magnetic sensor 71 at the start of the rotation angle computing process based on forced rotation as a reference magnetic pole are defined as relative pole numbers. The relative pole number of a magnetic pole sensed by the first magnetic sensor 71 (hereinafter, referred to as "first relative pole number") is expressed by a variable r1, the relative pole number of a magnetic pole sensed by the second magnetic sensor 72 (hereinafter, referred to as "second relative pole number") is expressed by a variable r2, and the relative pole number of a magnetic pole sensed by the third magnetic sensor 73 (hereinafter, referred to as "third relative pole number") is expressed by a variable r3. Each of the relative pole numbers r1, r2, r3 takes an integer from one to eight, the relative pole number that is smaller than one by one is eight, and the relative pole number that is greater than eight by one is one.

As shown in FIG. 12, in the memory of the torque computation ECU 77, there are provided, for example, areas denoted by e1 to e7. In the area e1, the angular width error correction values E are stored in association with the relative magnetic pole numbers 1 to 8. In the area e2, the amplitudes $A_1$ of the first output signal $S_1$ are stored in association with the relative magnetic pole numbers 1 to 8. In the area e3, the amplitudes $A_2$ of the second output signal $S_2$ are stored in association with the relative magnetic pole numbers 1 to 8. In the area e4, the amplitudes $A_3$ of the third output signal $S_3$ are stored in association with the relative magnetic pole numbers 1 to 8.

In the area e5, the first relative pole numbers r1(n−k) to r1(n) for multiple computation periods are stored. In the area e6, the second relative pole numbers r2(n−k) to r2(n) for the computation periods are stored. In the area e7, the third relative pole numbers r3(n−k) to r3(n) for the multiple computation periods are stored. Here, k is a natural number that is equal to or greater than 3. Referring back to FIG. 11A, the following description will be provided. In the rotation angle computing process based on forced rotation, the steering wheel 2 automatically rotates for a short time. Therefore, there is a possibility that a driver will erroneously recognize that a failure has occurred. Thus, the rotation angle computation unit gives the driver a warning to avoid an erroneous recognition (step S11). Specifically, the rotation angle computation unit transmits a warning output command to an image-voice control unit (not illustrated) used to control, for example, a display unit (not illustrated), and a voice output device (not illustrated) arranged in the vehicle. Upon reception of the warning output command, the image-voice control unit causes the display unit to display a message "STEERING WHEEL IS FORCEDLY ROTATED, BUT THERE IS NO FAILURE", or causes the voice output device to output the message.

Then, the rotation angle computation unit drives the electric motor 18 to rotate the electric motor 18 in a first direction (step S12). Specifically, the rotation angle computation unit transmits, to the motor control ECU 12, a first forced rotation command according to which the electric motor 18 is driven to be rotated in the first direction. Upon reception of the first forced rotation command, the motor control ECU 12 drives the electric motor 18 to rotate the electric motor 18 in the first direction.

The rotation angle computation unit obtains the sensor values $S_1(n)$, $S_2(n)$, $S_3(n)$ from the respective magnetic sensors 71, 72, 73 (step S13). The process in step S13 is repeatedly executed with a predetermined computation period until an affirmative determination is made in step S19 or step S21 described later. The memory in the torque computation ECU 77 stores sensor values obtained at least at three timings. That is, the memory stores the sensor values from the sensor value obtained n-th preceding timing (n is a prescribed value) to the sensor value obtained most recently.

The rotation angle computation unit determines whether the present process is first process after the start of the rotation angle computing process based on forced rotation (step S14). If the present process is the first process after the start of the rotation angle computing process based on forced rotation (YES in step S14), the rotation angle computation unit executes a relative pole number setting process (step S15).

Figure 13:
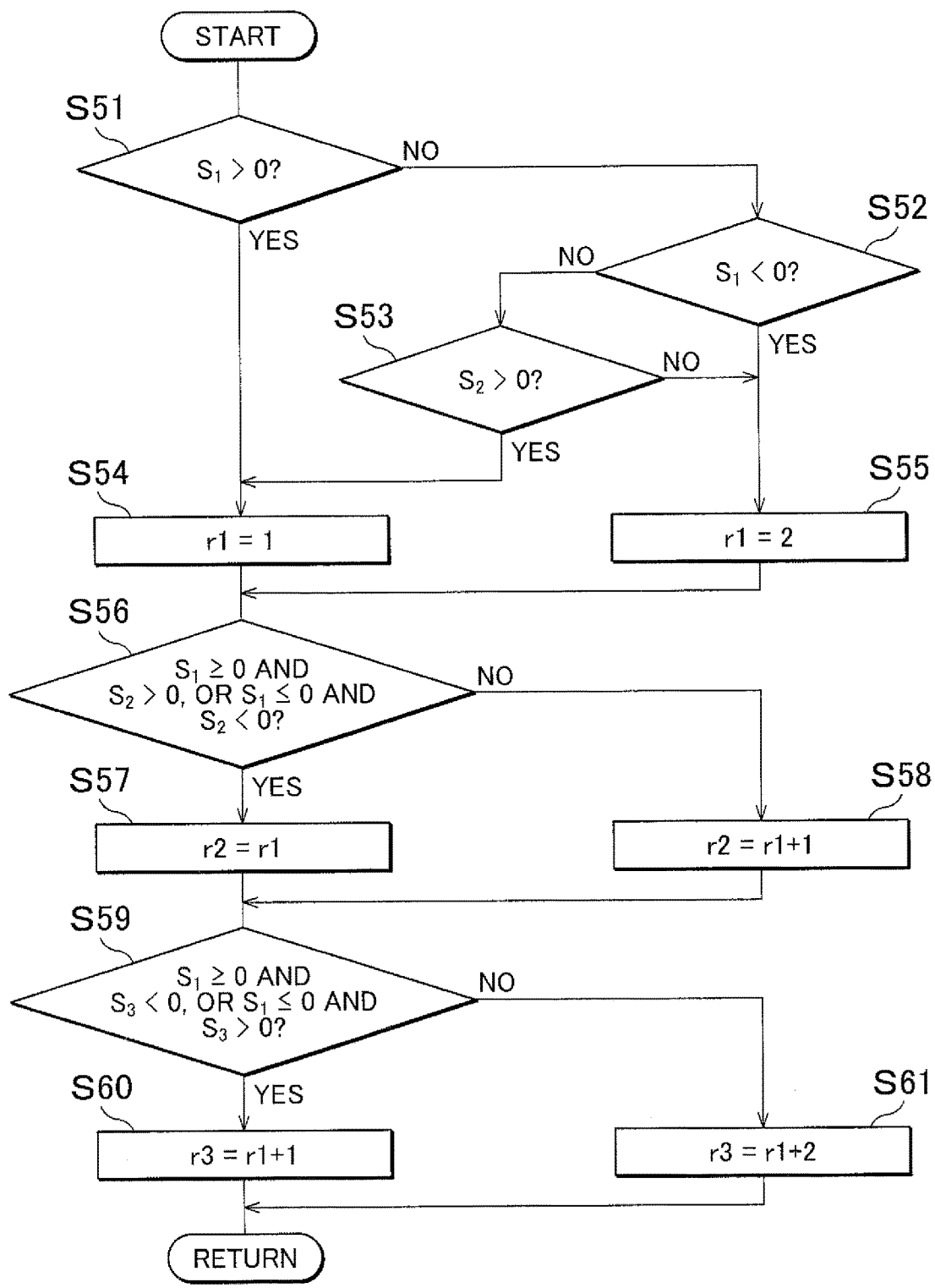
FIG. 13 is a flowchart showing the detailed procedure of a relative pole number setting process.

FIG. 13 is a flowchart showing the detailed procedure of the relative pole number setting process. First, the rotation angle computation unit determines whether the first output signal $S_1$ is greater than zero (step S51). If the first output signal $S_1$ is greater than zero (YES in step S51), the rotation angle computation unit determines that the magnetic pole sensed by the first magnetic sensor 71 is a north pole, and sets the first relative pole number r1 to one (step S54). Then, the rotation angle computation unit proceeds on to step S56.

On the other hand, if the first output signal $S_1$ is equal to or smaller than zero (NO in step S51), the rotation angle computation unit determines whether the first output signal $S_1$ is smaller than zero (step S52). If the first output signal $S_1$ is smaller than zero (YES in step S52), the rotation angle computation unit determines that the magnetic pole sensed by the first magnetic sensor 71 is a south pole, and sets the first relative pole number r1 to two (step S55). Then, the rotation angle computation unit proceeds on to step S56.

If it is determined in step S52 that the first output signal $S_1$ is equal to or greater than zero (NO in step S52), that is, if the first output signal $S_1$ is zero, the rotation angle computation unit determines whether the second output signal $S_2$ is greater than zero in order to determine whether the rotation angle of the input shaft 8 is 0° or 180° (step S53). If the second output signal $S_2$ is greater than zero (YES in step S53), the rotation angle computation unit determines that the rotation angle of the input shaft 8 is 0°, and sets the first relative pole number r1 to one (step S54). Then, the rotation angle computation unit proceeds on to step S56.

On the other hand, if the second output signal $S_2$ is equal to or smaller than zero (NO in step S53), the rotation angle computation unit determines that the rotation angle of the input shaft 8 is 180°, and sets the first relative pole number r1 to two (step S55). Then, the rotation angle computation unit proceeds on to step S56. In step S56, the rotation angle computation unit determines whether the condition that "$S_1 \geq 0$ and $S_2 > 0$" or the condition that "$S_1 \leq 0$ and $S_2 < 0$" is satisfied. When one of the above-described conditions is satisfied (YES in step S56), the rotation angle computation unit determines that the pole number of the magnetic pole sensed by the second magnetic sensor 72 is the same as the pole number of the magnetic pole sensed by the first magnetic sensor 71, and sets the second relative pole number r2 to the same number (r2=r1) as the first relative pole number r1 (step S57). Then, the rotation angle computation unit proceeds on to step S59.

On the other hand, when none of the conditions in step S56 are satisfied (NO in step S56), the rotation angle computation unit determines that the pole number of the magnetic pole sensed by the second magnetic sensor 72 is greater by one than the pole number of the magnetic pole sensed by the first magnetic sensor 71, and sets the second relative pole number r2 to a number greater by one than the first relative pole number r1 (r2=r1+1) (step S58). Then, the rotation angle computation unit proceeds on to step S59.

In step S59, the rotation angle computation unit determines whether the condition that "$S_1 \geq 0$ and $S_3 < 0$" or the condition that "$S_1 \leq 0$ and $S_3 > 0$" is satisfied. When one of the above-described conditions is satisfied (YES in step S59), the rotation angle computation unit determines that the pole number of the magnetic pole sensed by the third magnetic sensor 73 is greater by one than the pole number of the magnetic pole sensed by the first magnetic sensor 71, and sets the third relative pole number r3 to a number greater by one than the first relative pole number r1 (r3=r1+1) (step S60). Then, the rotation angle computation unit proceeds on to step S18 in FIG. 11B.

On the other hand, when none of the conditions in step S59 is satisfied (NO in step S59), the rotation angle computation unit determines that the pole number of the magnetic pole sensed by the third magnetic sensor 73 is greater by two than the pole number of the magnetic pole sensed by the first magnetic sensor 71, and sets the third relative pole number r3 to a number that is greater by two than the first relative pole number r1 (r3=r1+2) (step S61). Then, the rotation angle computation unit proceeds on to step S18 in FIG. 11B.

Figure 14A:
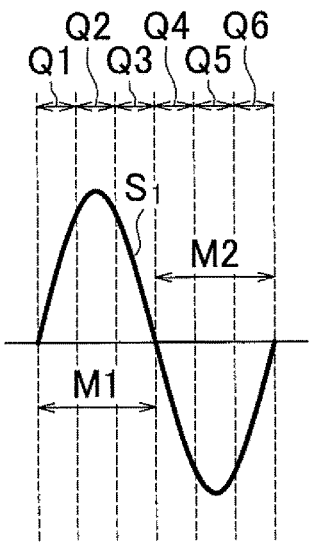
FIG. 14A is a schematic diagram illustrating the relative pole number setting process.
Figure 14B:
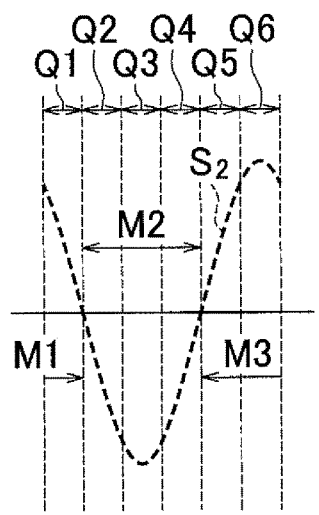
FIG. 14B is a schematic diagram illustrating the relative pole number setting process.
Figure 14C:
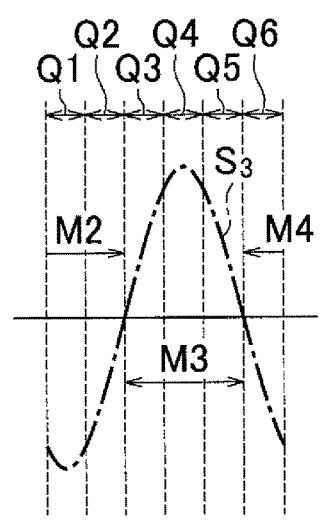
FIG. 14C is a schematic diagram illustrating the relative pole number setting process.

The reason why the second relative pole number r2 is set on the basis of the conditions in step S56 and the reason why the third relative pole number r3 is set on the basis of the conditions in step S59 will be described below. FIG. 14A, FIG. 14B, and FIG. 14C schematically illustrate signal waveforms of the first, second and third output signals $S_1$, $S_2$, $S_3$ at the time when a magnetic pole pair constituted of, for example, the magnetic pole M1 and the magnetic pole M2 in the magnet 61 passes by the first magnetic sensor 71.

In FIG. 14A, FIG. 14B and FIG. 14C, in regions indicated by Q1, Q4, the pole number of the magnetic pole sensed by the second magnetic sensor 72 is the same as the pole number of the magnetic pole sensed by the first magnetic sensor 71. In regions indicated by Q2, Q3, Q5, Q6, the pole number of the magnetic pole sensed by the second magnetic sensor 72 is greater by one than the pole number of the magnetic pole sensed by the first magnetic sensor 71.

In the region Q1, both the sensor values $S_1$, $S_2$ satisfy the first condition that $S_1 \geq 0$ and $S_2 > 0$. In the regions Q2, Q3, both the sensor values $S_1$, $S_2$ satisfy the second condition that $S_1 > 0$ and $S_2 \leq 0$. In the region Q4, both the sensor values $S_1$, $S_2$ satisfy the third condition that $S_1 \leq 0$ and $S_2 < 0$. In the regions Q5, Q6, both the sensor values $S_1$, $S_2$ satisfy the fourth condition that $S_1 < 0$ and $S_2 \geq 0$. When one of the first condition and the third condition is satisfied, the rotation angle computation unit determines that the pole number of the magnetic pole sensed by the second magnetic sensor 72 is the same as the pole number of the magnetic pole sensed by the first magnetic sensor 71. On the other hand, when neither the first condition nor the third condition is satisfied, the rotation angle computation unit determines that the pole number of the magnetic pole sensed by the second magnetic sensor 72 is greater by one than the pole number of the magnetic pole sensed by the first magnetic sensor 71.

In FIG. 14A, FIG. 14B, and FIG. 14C, in regions indicated by Q1, Q2 and regions indicated by Q4, Q5, the pole number of the magnetic pole sensed by the third magnetic sensor 73 is greater by one than the pole number of the magnetic pole sensed by the first magnetic sensor 71. In regions indicated by Q3, Q6, the pole number of the magnetic pole sensed by the third magnetic sensor 73 is greater by two than the pole number of the magnetic pole sensed by the first magnetic sensor 71.

In the regions Q1, Q2, both the sensor values $S_1$, $S_3$ satisfy the fifth condition that $S_1 \geq 0$ and $S_3 < 0$. In the region Q3, both the sensor values $S_1$, $S_3$ satisfy the sixth condition that $S_1 > 0$ and $S_3 \geq 0$. In the regions Q4, Q5, both the sensor values $S_1$, $S_3$ satisfy the seventh condition that $S_1 \leq 0$ and $S_3 > 0$. In the region Q6, both the sensor values $S_1$, $S_3$ satisfy the eighth condition that $S_1 < 0$ and $S_3 \leq 0$. When one of the fifth condition and the seventh condition is satisfied, the rotation angle computation unit determines that the pole number of the magnetic pole sensed by the third magnetic sensor 73 is greater by one than the pole number of the magnetic pole sensed by the first magnetic sensor 71. On the other hand, when neither the fifth condition nor the seventh condition is satisfied, the rotation angle computation unit determines that the pole number of the magnetic pole sensed by the third magnetic sensor 73 is greater by two than the pole number of the magnetic pole sensed by the first magnetic sensor 71.

As shown in FIG. 11A, if it is determined in step S14 that the present process is not the first process after the start of the rotation angle computing process based on forced rotation (NO in step S14), the rotation angle computation unit proceeds on to step S16. In step S16, the rotation angle computation unit determines whether zero-crossing of each of the sensor values $S_1$, $S_2$, $S_3$, that is, inversion of the sign of each of the sensor values $S_1$, $S_2$, $S_3$ is detected, on the basis of the sensor values $S_1$, $S_2$, $S_3$ stored in the memory. If zero-crossing is not detected (NO in step S16), the rotation angle computation unit proceeds on to step S18 in FIG. 11B.

If zero-crossing of one of the sensor values $S_1$, $S_2$, $S_3$ is detected in step S16 (YES in step S16), the rotation angle computation unit executes a relative pole number updating process (step S17). Specifically, the rotation angle computation unit changes the relative pole number r1, r2 or r3, which is presently set for the magnetic sensor that outputs the sensor value zero-crossing of which is detected in step S16, to a number that is greater by one or a number that is smaller by one than the presently set relative pole number r1, r2 or r3 on the basis of the rotation direction of the input shaft 8 (the magnet 61).

When the rotation direction of the input shaft 8 is the forward direction (the direction indicated by the arrow in FIG. 6), the rotation angle computation unit updates the relative pole number r1, r2, or r3 presently set for the magnetic sensor that outputs the sensor value zero-crossing of which is detected in step S16, to a number that is greater by one than the presently set relative pole number r1, r2 or r3. On the other hand, when the rotation direction of the input shaft 8 is the reverse direction, the rotation angle computation unit updates the relative pole number r1, r2, or r3 presently set for the magnetic sensor that outputs the sensor value zero-crossing of which is detected in step S 16, to a number that is smaller by one than the presently set relative pole number r1, r2 or r3. As described above, the relative pole number that is smaller than the relative pole number "one" by one is "eight". Further, the relative pole number that is greater than the relative pole number "eight" by one is "one".

The rotation direction of the input shaft 8 can be determined on the basis of, for example, the immediately preceding value and the present value of the output signal zero-crossing of which is detected and the present value of the other output signal. Specifically, when the output signal zero-crossing of which is detected is the first output signal $S_1$, if the condition that "the immediately preceding value of the first output signal $S_1$ is greater than zero, the present value of the first output signal $S_1$ is equal to or smaller than zero, and the second output signal $S_2$ is smaller than zero" or the condition that "the immediately preceding value of the first output signal $S_1$ is smaller than zero, the present value of the first output signal $S_1$ is equal to or greater than zero, and the second output signal $S_2$ is greater than zero" is satisfied, it is determined that the rotation direction is the forward direction (the direction indicated by the arrow in FIG. 6).

If the condition that "the immediately preceding value of the first output signal $S_1$ is equal to or greater than zero, the present value of the first output signal $S_1$ is smaller than zero, and the second output signal $S_2$ is greater than zero" or the condition that "the immediately preceding value of the first output signal $S_1$ is equal to or smaller than zero, the present value of the first output signal $S_1$ is greater than zero, and the second output signal $S_2$ is smaller than zero" is satisfied, it is determined that the rotation direction is the reverse direction. When the output signal zero-crossing of which is detected is the second output signal $S_2$, if the condition that "the immediately preceding value of the second output signal $S_2$ is greater than zero, the present value of the second output signal $S_2$ is equal to or smaller than zero, and the first output signal $S_1$ is greater than zero" or the condition that "the immediately preceding value of the second output signal $S_2$ is smaller than zero, the present value of the second output signal $S_2$ is equal to or greater than zero, and the first output signal $S_1$ is smaller than zero" is satisfied, it is determined that the rotation direction is the forward direction (the direction indicated by the arrow in FIG. 6). On the other hand, if the condition that "the immediately preceding value of the second output signal $S_2$ is equal to or greater than zero, the present value of the second output signal $S_2$ is smaller than zero, and the first output signal $S_1$ is smaller than zero" or the condition that "the immediately preceding value of the second output signal $S_2$ is equal to or smaller than zero, the present value of the second output signal $S_2$ is greater than zero, and the first output signal $S_1$ is greater than zero" is satisfied, it is determined that the rotation direction is the reverse direction.

When the output signal zero-crossing of which is detected is the third output signal $S_3$, if the condition that "the immediately preceding value of the third output signal $S_3$ is greater than zero, the present value of the third output signal $S_3$ is equal to or smaller than zero, and the second output signal $S_2$ is greater than zero" or the condition that "the immediately preceding value of the third output signal $S_3$ is smaller than zero, the present value of the third output signal $S_3$ is equal to or greater than zero, and the second output signal $S_2$ is smaller than zero" is satisfied, it is determined that the rotation direction is the forward direction (the direction indicated by the arrow in FIG. 6).

On the other hand, if the condition that "the immediately preceding value of the third output signal $S_3$ is equal to or greater than zero, the present value of the third output signal $S_3$ is smaller than zero, and the second output signal $S_2$ is smaller than zero" or the condition that "the immediately preceding value of the third output signal $S_3$ is equal to or smaller than zero, the present value of the third output signal $S_3$ is greater than zero, and the second output signal $S_2$ is greater than zero" is satisfied, it is determined that the rotation direction is the reverse direction. When the relative pole number updating process ends, the rotation angle computation unit proceeds on to step S18 in FIG. 11B. In step S18, the rotation angle computation unit determines whether the condition that the first and second magnetic sensors 71, 72 sense one and the same magnetic pole for three consecutive computation periods is satisfied. If the condition in step S18 is not satisfied (NO in step S18), the rotation angle computation unit determines whether the condition that the second and third magnetic sensors 72, 73 sense one and the same magnetic pole for three consecutive computation periods is satisfied (step S20). If the condition in step S20 is not satisfied (NO in step S20), the rotation angle computation unit returns to step S13 in FIG. 11A.

If it is determined in step S18 that the condition in step S18 is satisfied (YES in step S18), the rotation angle computation unit determines whether the condition that none of the denominators of the fractions included in the arithmetic expressions used to compute $E\theta$ and $E$ are zero is satisfied (step S19). If the condition in step S19 is not satisfied (NO in step S19), the rotation angle computation unit returns to step S13 in FIG. 11A. On the other hand, if the condition in step S19 is satisfied (YES in step S19), the rotation angle computation unit proceeds on to step S22.

If it is determined in step S20 that the condition in step S20 is satisfied (YES in step S20), the rotation angle computation unit determines whether the condition that none of the denominators of the fractions included in the arithmetic expressions used to compute $E\Theta$ and $E$ are zero is satisfied (step S21). If the condition in step S21 is not satisfied (NO in step S21), the rotation angle computation unit returns to step S13 in FIG. 11A. On the other hand, if the condition in step S21 is satisfied (YES in step S21), the rotation angle computation unit proceeds on to step S22.

In step S22, the rotation angle computation unit drives the electric motor 18 to rotate the electric motor 18 in a second direction that is the opposite direction of the first direction. Specifically, the rotation angle computation unit transmits, to the motor control ECU 12, a second forced rotation command according to which the electric motor 18 is driven to be rotated in the second direction. Upon reception of the second forced rotation command, the motor control ECU 12 drives the electric motor 18 to rotate the electric motor 18 in the second direction.

Then, the rotation angle computation unit obtains the sensor values $S_1(n)$, $S_2(n)$, $S_3(n)$ from the respective magnetic sensors, 71, 72, 73 (step S23). The process in step S23 is repeatedly executed with a predetermined computation period until an affirmative determination is made in step S27 or step S31 described later. Then, the rotation angle computation unit determines whether zero-crossing of each of the sensor values $S_1$, $S_2$, $S_3$, that is, inversion of the sign of each of the sensor values $S_1$, $S_2$, $S_3$ is detected, on the basis of the sensor values $S_1$, $S_2$, $S_3$ stored in the memory (step S24). If zero-crossing is not detected (NO in step S24), the rotation angle computation unit proceeds on to step S26 in FIG. 11C.

If zero-crossing of one of the sensor values $S_1$, $S_2$, $S_3$ is detected in step S24 (YES in step S24), the rotation angle computation unit executes a relative pole number updating process (step S25). The relative pole number updating process is the same as the relative pole number updating process in step S17 described above. When the relative pole number updating process in step S25 ends, the rotation angle computation unit proceeds on to step S26 in FIG. 11C.

In step S26, the rotation angle computation unit determines whether the condition that both the first and second magnetic sensors 71, 72 sense one and the same magnetic pole for three consecutive computation periods is satisfied. If the condition in step S26 is not satisfied (NO in step S26), the rotation angle computation unit determines whether the condition that both the second and third magnetic sensors 72, 73 sense one and the same magnetic pole for three consecutive computation periods is satisfied (step S30). If the condition in step S30 is not satisfied (NO in step S30), the rotation angle computation unit returns to step S23 in FIG. 11B.

If it is determined in step S26 that the condition in step S26 is satisfied (YES in step S26), the rotation angle computation unit determines whether the condition that none of the denominators of the fractions included in the Eθ basic arithmetic expression and the E arithmetic expression for the first computation mode are zero is satisfied (step S27). If the condition in step S27 is not satisfied (NO in step S27), the rotation angle computation unit returns to step S23 in FIG. 11B.

If it is determined that the condition in step S27 is satisfied (YES in step S27), the rotation angle computation unit computes the values of $θ(n)$, E, $A_1$, and $A_2$ in the first computation mode (step S28). Then, the rotation angle computation unit stores the computed values of E, $A_1$, and $A_2$ in the memory in association with the relative pole number of the magnetic pole sensed by the first and second magnetic sensors 71, 72 (step S29). The relative pole number of the magnetic pole sensed by the first and second magnetic sensors 71, 72 is the same number as the presently set first relative pole number r1 or second relative pole number r2. Specifically, the rotation angle computation unit stores the computed values of E, $A_1$, and $A_2$ in the storage locations in the areas e1, e2, e3 of the memory, which are associated with the presently set first relative pole number r1. Then, the rotation angle computation unit proceeds on to step S34.

If it is determined in step S30 that the condition in step S30 is satisfied (YES in step S30), the rotation angle computation unit determines whether the condition that none of the denominators of the fractions included in the EΘ basic arithmetic expression and the E arithmetic expression for the second computation mode are zero is satisfied (step S31). If the condition in step S31 is not satisfied (NO in step S31), the rotation angle computation unit returns to step S23 in FIG. 11B.

If it is determined that the condition in step S31 is satisfied (YES in step S31), the rotation angle computation unit computes the values of $θ(n)$, E, $A_2$, and $A_3$ in the second computation mode (step S32). Then, the rotation angle computation unit stores the computed values of E, $A_2$, and $A_3$ in the memory in association with the relative pole number of the magnetic pole sensed by the second and third magnetic sensors 72, 73 (step S33). The relative pole number of the magnetic pole sensed by the second and third magnetic sensors 72, 73 is the same number as the presently set second relative pole number r2 or third relative pole number r3. Specifically, the rotation angle computation unit stores the computed values of E, $A_2$, and $A_3$ in the storage locations in the areas e1, e3, e4 of the memory, which are associated with the presently set third relative pole number r3. Then, the rotation angle computation unit proceeds on to step S34.

In step S34, the rotation angle computation unit stops driving of the electric motor 18 and cancels the warning for the driver. Specifically, the rotation angle computation unit transmits a driving stop command for the electric motor 18 to the motor control ECU 12, and also transmits a warning cancellation command to the image-voice control unit. Upon reception of the driving stop command for the electric motor 18, the motor control ECU 12 stops driving of the electric motor 18. Upon reception of the warning cancellation command, the image-voice control unit cancels the warning display, the warning voice output, or the like. Thus, the rotation angle computing process based on forced rotation ends.

Figure 15A:
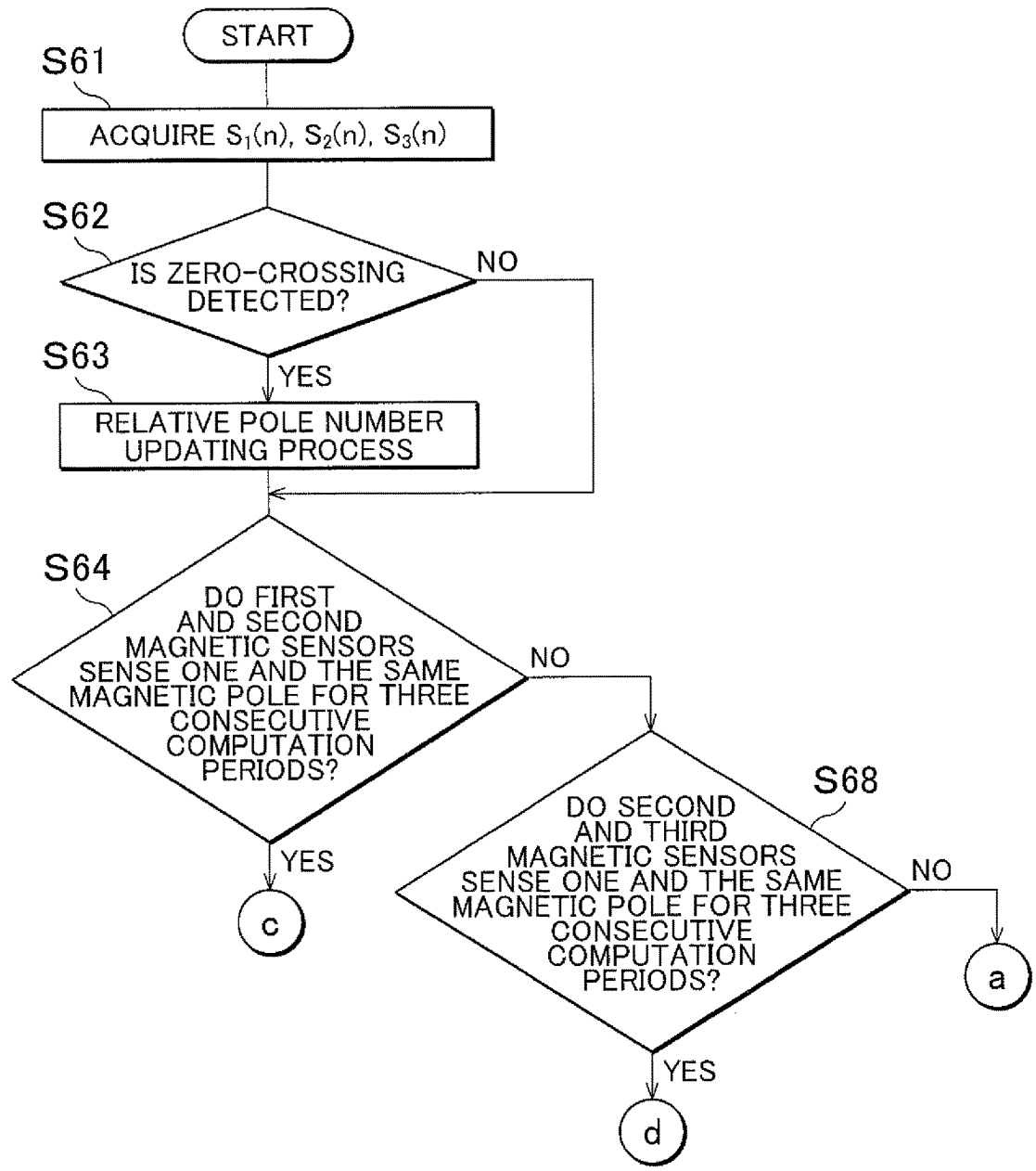
FIG. 15A is a flowchart showing part of the procedure of a normal rotation angle computing process in step S2 in FIG. 10.
Figure 15B:
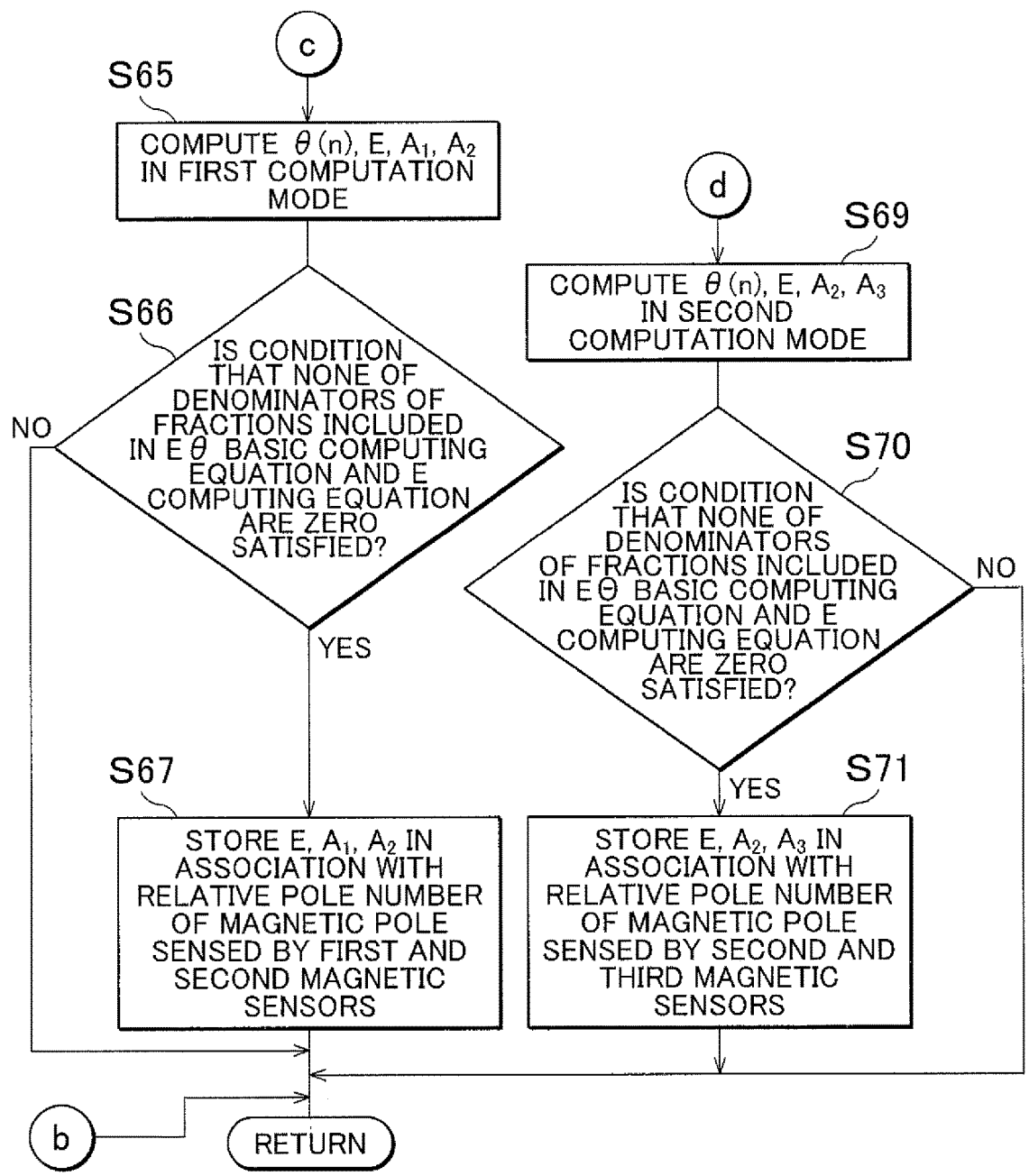
FIG. 15B is a flowchart showing part of the procedure of the normal rotation angle computing process in step S2 in FIG. 10.
Figure 16:
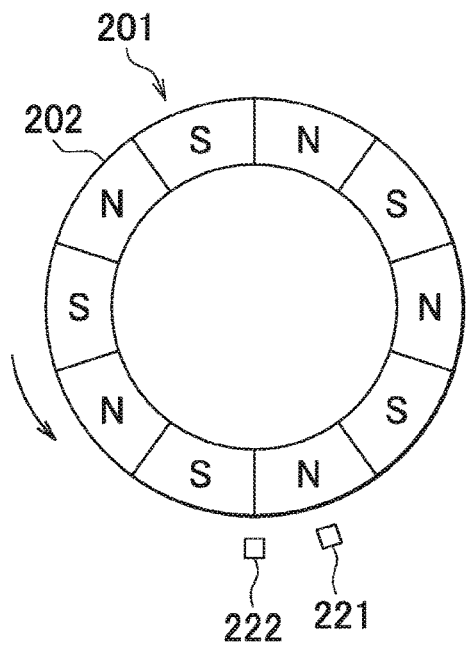
FIG. 16 is a schematic diagram illustrating a rotation angle detection method executed by a conventional rotation angle detection device.
Figure 17:
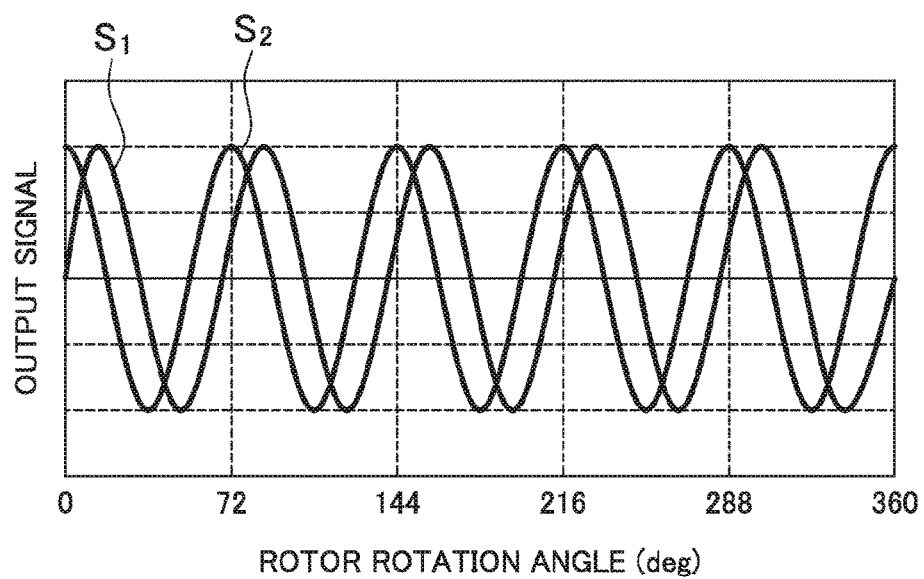
FIG. 17 is a schematic diagram illustrating waveforms of output signals from a first magnetic sensor and a second magnetic sensor.

FIG. 15A, FIG. 15B and FIG. 15C are flowcharts showing the procedure of the normal rotation angle computing process in step S2 in FIG. 10. The process in FIG. 15A, FIG. 15B and FIG. 15C is repeatedly executed with a predetermined computation period. The rotation angle computation unit obtains the sensor values $S_1(n)$, $S_2(n)$, $S_3(n)$ from the respective magnetic sensors, 71, 72, 73 (step S61). Then, the rotation angle computation unit determines whether zero-crossing of each of the sensor values $S_1$, $S_2$, $S_3$, that is, inversion of the sign of each of the sensor values $S_1$, $S_2$, $S_3$ is detected, on the basis of the sensor values $S_1$, $S_2$, $S_3$ stored in the memory (step S62). If zero-crossing is not detected (NO in step S62), the rotation angle computation unit proceeds on to step S64.

If zero-crossing of one of the sensor values $S_1$, $S_2$, $S_3$ is detected in step S62 (YES in step S62), the rotation angle computation unit executes a relative pole number updating process (step S63). The relative pole number updating process is the same as the relative pole number updating process in step S17 in FIG. 11A described above. When the relative pole number updating process in step S63 ends, the rotation angle computation unit proceeds on to step S64.

In step S64, the rotation angle computation unit determines whether the condition that both the first and second magnetic sensors 71, 72 sense one and the same magnetic pole for three consecutive computation periods is satisfied. If the condition in step S64 is satisfied (YES in step S64), the rotation angle computation unit computes the values of $θ(n)$, E, $A_1$, and $A_2$ in the first computation mode (step S65). At the time of computing the rotation angle $θ(n)$ in the first computation mode, the rotation angle computation unit determines whether the denominators of the fractions included in the Eθ basic arithmetic expression are not zero and whether the denominators of the fractions included in the E arithmetic expression are not zero, and computes the values of θ(n), E, $A_1$, and $A_2$ on the basis of the results of determinations.

After computing the values of θ(n), E, $A_1$, and $A_2$, the rotation angle computation unit determines whether the condition that none of the denominators of the fractions included in the Eθ basic arithmetic expression and the E arithmetic expression are zero is satisfied (step S66). If the condition in step S66 is satisfied (YES in step S66), the rotation angle computation unit stores the computed values of E, $A_1$, and $A_2$ in the memory in association with the relative pole number of the magnetic pole sensed by the first and second magnetic sensors 71, 72 (step S67). The relative pole number of the magnetic pole sensed by the first and second magnetic sensors 71, 72 is the same number as the presently set first relative pole number r1 or second relative pole number r2. Specifically, the rotation angle computation unit stores the computed values of E, $A_1$, and $A_2$ in the storage locations in the areas e1, e2, e3 of the memory, which are associated with the presently set first relative pole number r1. Note that, if the values of E, $A_1$, and $A_2$ have already been stored in the above-described storage locations in the areas e1, e2, e3 of the memory, the already stored values of E, $A_1$, and $A_2$ are overwritten with the presently computed values of E, $A_1$, and $A_2$. Then, the rotation angle computation unit ends the process in the present computation period.

If it is determined in step S66 that the condition in step S66 is not satisfied (NO in step S66), the rotation angle computation unit ends the process in the present computation period without executing the process in step S67. Therefore, in this case, the values of E, $A_1$, and $A_2$ computed in step S65 are not stored in the areas e1, e2, e3 of the memory.

If it is determined in step S64 that the condition in step S64 is not satisfied (NO in step S64), the rotation angle computation unit determines whether the condition that both the second and third magnetic sensors 72, 73 sense one and the same magnetic pole for three consecutive computation periods is satisfied (step S68). If the condition in step S68 is satisfied (YES in step S68), the rotation angle computation unit computes the values of θ(n), E, $A_2$, and $A_3$ in the second computation mode (step S69). At the time of computing the rotation angle θ(n) in the second computation mode, the rotation angle computation unit determines whether the denominators of the fractions included in the EΘ basic arithmetic expression are not zero and whether the denominators of the fractions included in the E arithmetic expression are not zero, and computes the values of θ(n), E, $A_2$, and $A_3$ on the basis of the results of determinations.

After computing the values of θ(n), E, $A_2$, and $A_3$, the rotation angle computation unit determines whether the condition that none of the denominators of the fractions included in the EΘ basic arithmetic expression and the E arithmetic expression are zero is satisfied (step S70). If the condition in step S70 is satisfied (YES in step S70), the rotation angle computation unit stores the computed values of E, $A_2$, and $A_3$ in the memory in association with the relative pole number of the magnetic pole sensed by the second and third magnetic sensors 72, 73 (step S71). The relative pole number of the magnetic pole sensed by the second and third magnetic sensors 72, 73 is the same number as the presently set second relative pole number r2 or third relative pole number r3. Specifically, the rotation angle computation unit stores the computed values of E, $A_2$, and $A_3$ in storage locations in the areas e1, e3, e4 of the memory, which are associated with the presently set third relative pole number r3. Note that, if the values of E, $A_2$, and $A_3$ have already been stored in the above-described storage locations in the areas e1, e3, e4 of the memory, the already stored values of E, $A_2$, and $A_3$ are overwritten with the presently computed values of E, $A_2$, and $A_3$. Then, the rotation angle computation unit ends the process in the present computation period.

If it is determined in step S70 that the condition in step S70 is not satisfied (NO in step S70), the rotation angle computation unit ends the process in the present computation period without executing the process in step S71. Therefore, in this case, the values of E, $A_2$, and $A_3$ computed in step S69 are not stored in the areas e1, e3, e4 of the memory.

If it is determined in step S68 that the condition in step S68 is not satisfied (NO in step S68), it is determined whether the magnetic pole width error correction value E corresponding to the magnetic pole sensed by the first magnetic sensor 71 is stored in the memory (step S72). This determination is made based on whether the magnetic pole width error correction value E is stored in a storage location in the area e1 of the memory, which is associated with the presently set first relative pole number r1.

If the magnetic pole width error correction value E corresponding to the magnetic pole sensed by the first magnetic sensor 71 is stored in the memory (YES in step S72), the rotation angle computation unit computes the rotation angle θ(n) in the third computation mode (step S73). Then, the rotation angle computation unit ends the process in the present computation period. If it is determined in step S72 that the magnetic pole width error correction value E corresponding to the magnetic pole sensed by the first magnetic sensor 71 is not stored in the memory (NO in step S72), the rotation angle computation unit proceeds on to step S74. In step S74A, the rotation angle computation unit determines whether the magnetic pole width error correction value E corresponding to the magnetic pole sensed by the second magnetic sensor 72 is stored in the memory. This determination is made based on whether the magnetic pole width error correction value E is stored in a storage location in the area e2 of the memory, which is associated with the presently set second relative pole number r2.

If the magnetic pole width error correction value E corresponding to the magnetic pole sensed by the second magnetic sensor 72 is stored in the memory (YES in step S74), the rotation angle computation unit computes the rotation angle θ(n) in the fourth computation mode (step S75). Then, the rotation angle computation unit ends the process in the present computation period. If it is determined in step S74 that the magnetic pole width error correction value E corresponding to the magnetic pole sensed by the second magnetic sensor 72 is not stored in the memory (NO in step S74), the rotation angle computation unit computes the rotation angle θ(n) in the fifth computation mode (step S76). Then, the rotation angle computation unit ends the process in the present computation period.

While one example embodiment of the invention has been described above, the invention may be implemented in various other embodiments. For example, step S66 in FIG. 15B may be omitted and step S67 may be executed after completion of the process in step S65. Likewise, step S70 in FIG. 15B may be omitted and step S71 may be executed after completion of the process in step S69.

A backup magnetic sensor may be arranged so as to be apart from the second magnetic sensor 72 in the radial direction of the input shaft 8. When the second magnetic sensor 72 malfunctions, an output signal from the backup magnetic sensor may be used instead of an output signal from the second magnetic sensor 72.

What is claimed is:

1. A rotation angle detection device comprising:
    a multipolar magnet that rotates in accordance with rotation of a rotary body, and that has a plurality of magnetic poles;
    three magnetic sensors that respectively output sinusoidal signals having a predetermined phase difference in accordance with rotation of the multipolar magnet;
    a sampling unit that samples an output signal from each of the magnetic sensors at prescribed timings;
    a computation unit that:
        computes a rotation angle of the rotary body based on the output signals from two magnetic sensors among the three magnetic sensors, the output signals being sampled at three sampling timings, when a condition that both the two magnetic sensors among the three magnetic sensors sense one and the same magnetic pole for three consecutive sampling periods is satisfied;
        computes information regarding a magnetic pole width of the magnetic pole sensed by the two magnetic sensors and information regarding amplitudes of the output signals from the two magnetic sensors and stores the information regarding the magnetic pole width and the information regarding the amplitudes in association with the magnetic pole sensed by the two magnetic sensors when the information regarding the magnetic pole width and the information regarding the amplitudes are not stored; and
        computes the rotation angle of the rotary body based on the stored information and the output signals from two magnetic sensors among the three magnetic sensors, the two magnetic sensors including one of the three magnetic sensors, which senses the magnetic pole associated with the stored information regarding the magnetic pole width, when the condition is not satisfied.

2. The rotation angle detection device according to claim 1, wherein in a case where the three magnetic sensors are a first magnetic sensor, a second magnetic sensor, and a third magnetic sensor, a phase difference between an output signal from the first magnetic sensor and an output signal from the second magnetic sensor is 120°, and a phase difference between the output signal from the first magnetic sensor and an output signal from the third magnetic sensor is 240°.

3. The rotation angle detection device according to claim 2, wherein:
    the information regarding the magnetic pole width of the magnetic pole is a magnetic pole width error correction value used to correct a rotation angle error based on a magnetic pole width error of the magnetic pole;
    an output signal $S_1$ from the first magnetic sensor is expressed by $S_1=A_1 \sin(E_1\theta)$ where $A_1$ is an amplitude of the output signal from the first magnetic sensor, $E_1$ is a magnetic pole width error correction value corresponding to a magnetic pole sensed by the first magnetic sensor, and $\theta$ is the rotation angle of the rotary body;
    an output signal $S_2$ from the second magnetic sensor is expressed by $S_2=A_2 \sin(E_2\theta+120)$ where $A_2$ is an amplitude of the output signal from the second magnetic sensor and $E_2$ is a magnetic pole width error correction value corresponding to a magnetic pole sensed by the second magnetic sensor; and
    an output signal $S_3$ from the third magnetic sensor is expressed by $S_3=A_3 \sin(E_3\theta+240)$ where $A_3$ is an amplitude of the output signal from the third magnetic sensor and $E_3$ is a magnetic pole width error correction value corresponding to a magnetic pole sensed by the third magnetic sensor.

* * * * *